(12) United States Patent
Rangarajan et al.

(10) Patent No.: US 11,838,334 B2
(45) Date of Patent: Dec. 5, 2023

(54) UPDATING USER-SPECIFIC APPLICATION INSTANCES BASED ON COLLABORATIVE OBJECT ACTIVITY

(71) Applicant: MICROSOFT TECHNOLOGY LICENSING, LLC, Redmond, WA (US)

(72) Inventors: Rajesh Rangarajan, Redmond, WA (US); Aaron William Linne, Bellevue, WA (US); Rajiv Ramaiah, Scottsdale, AZ (US); Archana Saseetharan, Redmond, WA (US); Mansoor Malik, Kirkland, WA (US); Shiraz Cupala, Seattle, WA (US); Beste Nazilli, Redmond, WA (US); Kevin Daniel Morrison, Arlington, MA (US); Sagar Nagaraja Shastry, Everett, WA (US); Eric Jonathan Hull, Seattle, WA (US); Alexander Tobias Powell, Redmond, WA (US); Lei Yang, Sammamish, WA (US); Manasi Sharma, Redmond, WA (US); Siddharth Uppal, Bothell, WA (US); Yuri Dogandjiev, Renton, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/549,391

(22) Filed: Dec. 13, 2021

(65) Prior Publication Data
US 2022/0303322 A1 Sep. 22, 2022

Related U.S. Application Data

(63) Continuation of application No. 17/207,078, filed on Mar. 19, 2021, now Pat. No. 11,228,627.

(51) Int. Cl.
*G06F 15/16* (2006.01)
*H04L 65/402* (2022.01)
(Continued)

(52) U.S. Cl.
CPC ...... *H04L 65/4025* (2022.05); *H04L 12/1818* (2013.01); *H04L 12/1831* (2013.01); *H04L 65/403* (2013.01)

(58) Field of Classification Search
None
See application file for complete search history.

(56) References Cited

U.S. PATENT DOCUMENTS 9,413,739 B1 * 8/2016 Rose ............... H04L 63/08
11,175,806 B1 * 11/2021 McCue ............. G06Q 10/103
(Continued)

OTHER PUBLICATIONS

"International Search Report and Written Opinion Issued in PCT Application No. PCT/US21/055932", dated Jan. 24, 2022, 12 Pages.

*Primary Examiner* — Phyllis A Book
(74) *Attorney, Agent, or Firm* — Newport IP, LLC; Jacob P. Rohwer

(57) ABSTRACT

Updating user-specific instances of a second application for individual users of a group based on a data file for the second application being shared via a collaboration object that corresponds to the group within a first application. The instances of the second application present each individual user with their own custom user experience that is configured to provide access to specific content based on object permissions data. An application extension is executable, by the first application, to extend content editing functionalities of the second application into the collaboration object. Responsive to specific content being associated with the collaboration object via the application extension, each of the instances of the second application may be automatically updated to provide direct access to the specific content.

(Continued)

Thus, each user within the group defined for collaboration object can access the data file via the collaboration object and their own instance of the second application.

20 Claims, 12 Drawing Sheets

(51) Int. Cl.
 *H04L 12/18* (2006.01)
 *H04L 65/403* (2022.01)

(56) References Cited

U.S. PATENT DOCUMENTS

| | | | |
|---|---|---|---|
| 2005/0097440 A1* | 5/2005 | Lusk | G06Q 10/10 715/752 |
| 2009/0172101 A1* | 7/2009 | Arthursson | G06F 3/0486 709/205 |
| 2011/0264686 A1* | 10/2011 | Cavagnari | G06Q 10/10 707/769 |
| 2012/0192055 A1 | 7/2012 | Antebi et al. | |
| 2014/0047413 A1* | 2/2014 | Sheive | G06F 8/33 717/110 |
| 2014/0282098 A1* | 9/2014 | McConnell | G06Q 10/0639 715/753 |
| 2015/0149404 A1 | 5/2015 | Lock et al. | |
| 2017/0142259 A1* | 5/2017 | Schmitz | H04L 65/1069 |
| 2019/0026269 A1* | 1/2019 | Spataro | G06Q 10/10 |
| 2019/0065699 A1* | 2/2019 | Bose | G06F 21/00 |
| 2019/0124169 A1* | 4/2019 | Sundin | H04L 67/535 |
| 2020/0099648 A1* | 3/2020 | Luthra | G06F 16/94 |
| 2020/0116430 A1* | 4/2020 | Nakae | F28F 1/325 |
| 2020/0220928 A1* | 7/2020 | Karande | G06F 9/54 |
| 2020/0412861 A1* | 12/2020 | Awatani | H04M 1/2745 |
| 2021/0201371 A1* | 7/2021 | Andrews | G06Q 30/06 |
| 2022/0116430 A1* | 4/2022 | Mayfield | H04L 65/1093 |

* cited by examiner

UPDATING USER-SPECIFIC APPLICATION INSTANCES BASED ON COLLABORATIVE OBJECT ACTIVITY

CROSS-REFERENCE TO RELATED APPLICATION

This application is a continuation of U.S. patent application Ser. No. 17/207,078, filed Mar. 19, 2021, the content of which application is hereby expressly incorporated herein by reference in its entirety.

BACKGROUND

Web-based collaboration platforms facilitate virtual meetings and a variety of other forms of collaboration between groups of users. For example, web conference systems allow users, in two or more remote locations, to communicate interactively with each other via live, simultaneous two-way video streams, audio streams, or both. Participants of a virtual meeting oftentimes use screen sharing to enable attendees of a virtual meeting to simultaneously view and discuss content that is being generated via an application that is different than the web conferencing system being used to facilitate the virtual meeting. For example, during a virtual meeting being facilitated via ZOOM or MICROSOFT TEAMS, a user may share their screen to enable other users to see content that the user is generating in a word processing application such as MICROSOFT WORD or a notetaking application such as MICROSOFT ONENOTE.

One major drawback of existing web-based collaboration platforms is that multiple different users are not typically enabled to collaboratively edit the same content that is shared in association with a collaboration object (e.g., a virtual meeting, persistent message thread, etc.). For example, under circumstances where a user shares her screen during a virtual meeting while she is actively editing a document via a notetaking application, the other users with whom the screen is being shared with can only view the content that is displayed on the shared screen. This drawback often leads users to share data files via email prior to or during a virtual meeting so that each user can both view and edit the content that is being discussed. However, this results in the users having to sift through messages to find the content. Furthermore, since each user is editing a different instance of the content, the foregoing techniques lead to unnecessary content proliferation and potentially disparate impressions of content that is discussed and agreed upon during a virtual meeting. For example, each user may take their own notes which may not align with other peoples' notes or impressions of what was discussed and/or agreed upon.

It is with respect to these and other considerations that the following disclosure is made.

SUMMARY

The techniques disclosed herein enable a system to update user-specific instances of an application for individual users of a group in response to a data file for the application being associated with a collaboration object that corresponds to the entire group within a different application. Generally described, the user-specific instances of the application present each individual user with their own custom user experience that provides access to specific data files based on object permissions for the application. In some examples, the application may be a notetaking application through which an individual user can access and edit files that the object permissions indicate that she is permitted to access. The files may include content that the individual user has created herself and retains exclusive access to and/or content that has been created by another user and shared with the individual user via the collaboration object. An application extension may be executable by the different application (e.g., a web-conferencing application) to extend content editing functionalities of the application into the collaboration object. For example, the application extension may enable a web-conferencing application to implement content editing functions of a stand-alone notetaking application within a virtual meeting (e.g., an exemplary form of collaboration object). In response to a data file of the application being accessed in association with the collaboration object through the application extension, each of the user-specific instances of the application may be automatically updated to provide direct access to the data file. In this way, each of the users within the user group associated with the collaboration object is enabled to access the data file via both of the collaboration object (that is accessible by the entire user group) and their own user-specific instance of the application.

As a specific but non-limiting example, the collaboration object may be a communication session (e.g., a virtual meeting or web-based conference) that is facilitated between the entire group of users by a web-based collaboration platform that transmits bi-directional user streams between a plurality of client devices. For example, individual ones of the client devices may continuously capture audio and video "A/V" data (e.g., of a user) via various input devices such as cameras and microphones. The captured A/V data may be continuously streamed to a server device(s). Upon receiving the AV data streams, the server device(s) transmit to each individual client device the streams of A/V data that is received from each other client device. Thus, each individual client device is enabled to render live audio and/or video of the participants who are utilizing the other client devices. In this example, the web-based collaboration platform may execute an application extension of the application in association with the communication session. In this way, functionalities that are provided within each user-specific instance of the application may be extended into the communication session. Exemplary applications which may be extended into a communication session include, but are not limited to, the notetaking application described above, a form generation application, a whiteboard application, and so on. For purposes of the present example, presume that the web-based collaboration platform exposes content editing functionalities of the notetaking application into the communication session via the application extension for the notetaking application. Then, in response to a data file being generated or modified during the virtual meeting via the application extension of the notetaking application, user-specific instances of the notetaking application that correspond to the group of users attending the virtual meeting may be automatically updated to provide each individual user of the group with access to the data file by way of their own user-specific instance of the notetaking application.

In an exemplary implementation, a system determines a group definition that associates multiple user accounts with a collaboration object corresponding to a first application. Exemplary collaboration objects may include, but are not limited to, communication sessions (e.g., virtual meetings), web-based calls, channels, chats, and email threads, and/or various other communication modalities that support collaborative editing of a data object. The group definition may correspond to an invitee list for a communication session, participants of a communication session and/or web-based call, members of a channel or chat, senders and/or recipients of an email thread, and so on. Accordingly, in various embodiments, the first application may be a web-conferencing application that is implemented by a web-based collaboration platform that facilitates the collaboration object. For example, a web-based collaboration platform may facilitate a virtual meeting or call by transmitting bi-directional user streams between a plurality of client devices.

The system receives an instruction to associate a data file corresponding to a second application with the collaboration object corresponding to the first application. For example, the instruction may correspond to a user generating a new data file (or opening an existing data file), that corresponds to a notetaking application, during a communication session that is being facilitated by the web-conferencing application via an application extension for the notetaking application. As described in detail below, the application extension may extend content editing functionalities of the second application into the collaboration object corresponding to the first application. In this way, one or more of the multiple user accounts associated with the collaboration object by the group definition are provided with the content editing functionalities of the second application directly through the collaboration object being facilitated by the first application. For example, under circumstances where the collaboration object is a virtual meeting being facilitated by a web-conferencing application and the application extension corresponds to the notetaking application, notetaking functionalities provided by the notetaking application are exposed with respect to data file directly within the virtual meeting.

Responsive to the instruction to associate the data file corresponding to the second application with the collaboration object corresponding to the first application, the system may automatically (e.g., without manual user input) configure object permissions data to grant the multiple user accounts (defined by the group definition of the collaboration object) with access to the data file. Additionally, the system may also update application configuration parameters for the second application in association with each of the multiple user accounts. Generally described, the application configuration parameters may control aspects of a user experience presented by the user-specific instances of the second application. For example, the application configuration parameters may dictate a listing of data files that are presented by each of the user-specific instances of the second application that uniquely correspond to the individual users defined by the group definition.

The application configuration parameters that are updated based on the object permissions data may be transmitted to user-specific instances of the second application for each of the multiple user accounts defined by the group definition for the collaboration object. Upon receipt, the application configuration parameters cause each user-specific instance of the second application to render a user interface element that is configured to provision access to the content of the data file that has been associated with the collaboration object based on the instruction received via the first application. Thus, the techniques described herein enable each of the users within the user group for the collaboration object to access the data file via both of the collaboration object (that is accessible by the entire user group) and their own user-specific instance of the application. In this way, users are seamlessly enabled to access content that was edited via the application extension being executed by the first application in association with the collaboration object directly via their own user-specific stand-alone instance of the second application.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
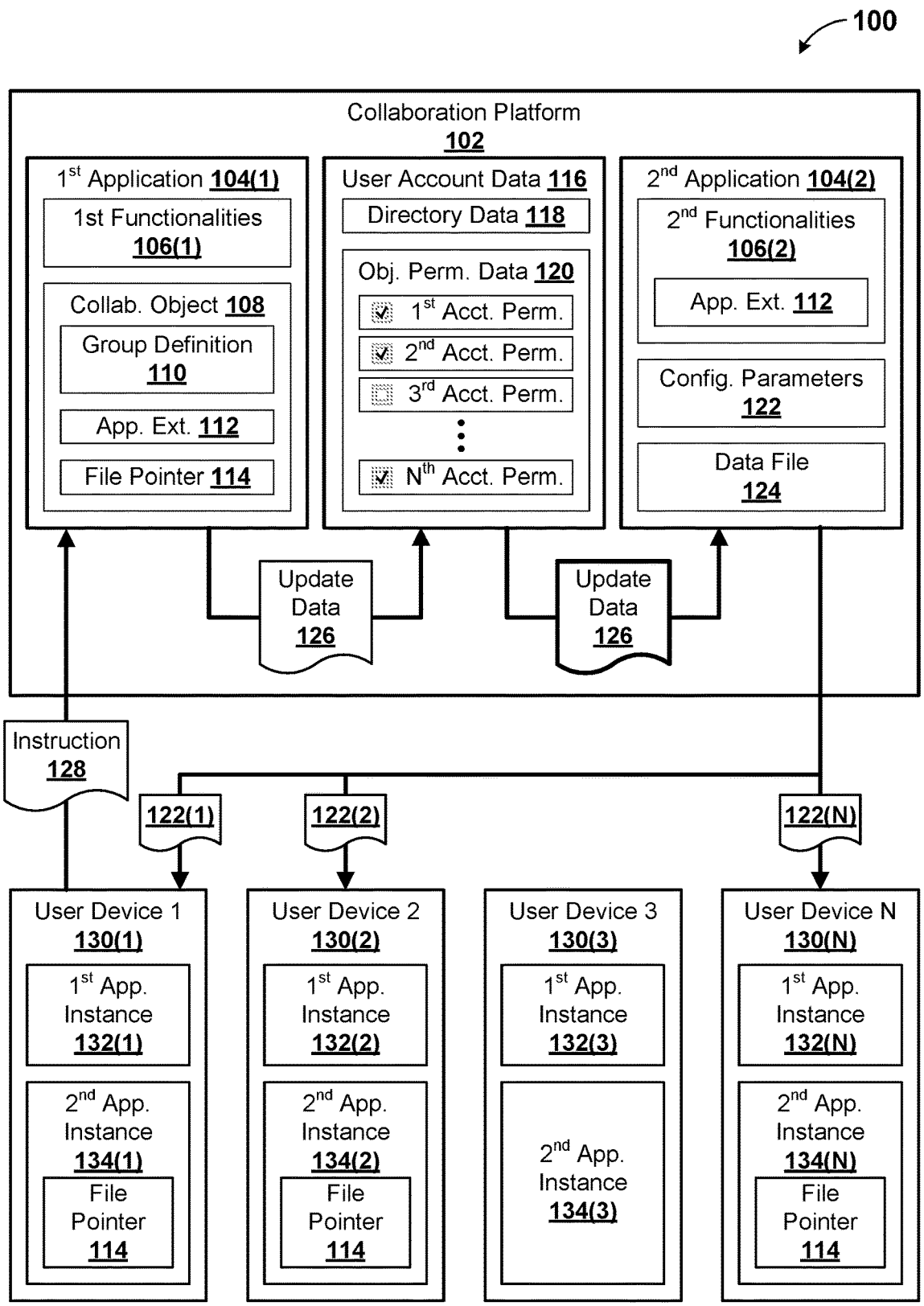
FIG. 1 is a system diagram illustrating an example environment in which a data file being accessed in association with a collaboration object of a first application causes user-specific instances of a second application for a group of users associated with the collaboration object to include a file pointer to the data file.

The following Detailed Description discloses techniques for updating user-specific instances of an application that correspond to individual users of a group based on a data file for the application becoming accessible via a collaboration object that corresponds to the entire group within a different application. The user-specific instances of the application present each individual user with their own custom user experience that is configured to provide access to specific content based on object permissions for the application. As a specific example, the application may be a notetaking application (e.g., MICROSOFT ONENOTE, MICROSOFT WHITEBOARD) through which an individual user can view and/or edit files that the object permissions indicate she is permitted to access. An application extension may be executable, by the different application, in association with the collaboration object to extend content editing functionalities of the application into the collaboration object. Responsive to specific content being associated with the collaboration object via the application extension, each of the user-specific instances of the application may be automatically updated to provide direct access to the specific content. In this way, each of the users within the user group associated with the collaboration object is enabled to access the data file via both of the collaboration object (that is accessible by the entire user group) and their own user-specific instance of the application.

The techniques disclosed herein are applicable to a variety of systems and approaches involving synchronizing content access permissions and presentation of specific pieces of content across disparate applications. Aspects of the disclosed techniques are described in the specific context of automatically configuring a user group's user-specific instances of a second application to include a pointer to a data file as a response to that data file being associated with a collaboration object that is accessible to the user group via a first application. Some aspects are described in relation to a specific example of the collaboration object being a communication session (e.g., a prescheduled virtual meeting, an impromptu virtual call, etc.) and content of the data file being collaboratively edited during the communication session by way of an application extension, of a notetaking application, that is executed by a web-conferencing application that is facilitating the communication session. While the presently disclosed techniques are not necessarily limited to these specific contexts or examples (unless claimed with such limiting recitations), an appreciation of various aspects of the disclosed techniques is readily gained through a discussion of these specific contents and examples. However, other arrangements such as a group of users' user-specific instances of a word processing application being updated to provide direct access to a word processing file in response to that word processing file being shared with the group of users via a chat, channel, and/or email thread shall be considered variations of the described and claimed techniques (unless clearly claimed to exclude such variations).

Various examples, scenarios, and aspects of the disclosed techniques are described below with reference to FIGS. 1-8.

FIG. 1 is a system diagram illustrating an example environment 100 in which a data file 124 being accessed in association with a collaboration object 108 of a first application 104(1) causes user-specific instances 134 of a second application 104(2) for a group of users associated with the collaboration object 108 to include a file pointer 114 to the data file 124. As illustrated, the example environment 100 includes a collaboration platform 102 that is in communication with a plurality of user devices 130. The collaboration platform 102 may include one or more servers that implement aspects of the first application 104(1) and the second application 104(2) in association with multiple user accounts. For purposes of the present discussion, presume that the collaboration platform 102 implements aspects of each of the first application 104(1) and the second application 104(2) in association with a first user account through an Nth user account. Further presume that the first user account corresponds to a first user device 130(1), the second user account corresponds to a second user device 130(2), and so on. For example, the first user device 130(1) may be operating based on login credentials for the first user account, the second user device 130(2) may be operating based on login credentials for the second user account, and so on.

As illustrated, each of the user devices 130 support corresponding first application instances 132 and second application instances 134, each of which are user-specific in the sense that the instances 132 and 134 operate in accordance with whichever user account is actively logged into the respective user device 130. Thus, the first user device 130(1) is supporting a first instance 132(1) of the first application 104(1) that corresponds to login credentials for the first user account, the second user device 130(2) is supporting a second instance 132(2) of the first application 104(1) that corresponds to login credentials for the second user account, and so on. Furthermore, the first user device 130(1) is supporting a first instance 134(1) of the second application 104(2) that corresponds to login credentials for the first user account, the second user device 130(2) is supporting a second instance 134(2) of the second application 104(2) that corresponds to login credentials for the second user account, and so on. The user-specific instances 134 of the second application 104(2) present a custom user experience that uniquely corresponds to the user account that is logged into that user-specific instance 134. In some embodiments, each custom user experience is configured to provide direct and seamless access to specific data files based on object permissions associated with the second application 104(2). For example, the first instance 134(1) (of the second application 104(2)) that is operating on the first user device 130(1) may present a listing of data files that user account data 116 indicates the first user account is permitted to access.

In the example environment 100, the collaboration platform 102 executes the first application 104(1) to implement first functionalities 106(1) in association with a collaboration object 108. As a specific example, the collaboration object 108 may be a communication session (e.g., a virtual meeting or web-based conference) that corresponds to a group definition 110. The group definition 110 may define a plurality of user accounts in association with the collaboration object 108. For example, the group definition 110 may correspond to a group of users that are invited to a pre-scheduled virtual meeting, a group of users that attend an impromptu virtual call, a group of users that have accepted an invitation to a pre-scheduled virtual meeting, a group of users that belong to a channel or chat, etc. For exemplary purposes, presume that the group definition 110 excludes the third user account and includes each of the first user account, the second user account, and the Nth user account. The collaboration platform 102 may maintain or otherwise have access to directory data 118 that defines attributes (e.g., usernames, passwords, departments, job titles, etc.) for the first through Nth user account.

As illustrated, the collaboration platform 102 receives an instruction 128 to associate a data file 124 with the collaboration object 108. The data file 124 may correspond to the second application 104(2). For example, the data file 124 may be a note page that viewable and editable via second functionalities 106(2) that are provided by the second application 104(2). In some embodiments, the instruction 128 causes the first application 104(1) to expose the second functionalities 106(2) with respect to content of the data file 124 by executing an application extension 112 of the second application 104(2) in association with the collaboration object 108. In this way, the application extension 112 enables the group of users associated with the collaboration object 108 to implement the second functionalities 106(2) of the second application 104(2) while collaboratively viewing the content of the data file 124 within the context of the collaboration object 108.

To illustrate this point, suppose that the collaboration object 108 is a virtual meeting that is being facilitated between the first user account, the second user account, and the Nth user account. In this context, the collaboration platform 102 may receive user streams from each of the first user device 130(1), the second user device 130(2), and the Nth user device 130(N). Thus, each of these user devices 130 may continuously capture audio and video "AV" data (e.g., of a user) via various input devices such as cameras and microphones. Each of these user devices 130 may also continuously stream the captured A/V data to the collaboration platform 102. Upon receiving the AV data streams, the collaboration platform 102 transmits to each individual user device the streams of A/V data that is received from each other user device. Thus, each individual user device is enabled to render live audio and/or video of the participants who are utilizing the other user devices.

In some embodiments, the instruction 128 may be generated based on a user input that selects an icon that corresponds to the second application 104(2) that is exposed by the user-specific instances 132 of the first application 104(1). The instruction 128 may cause the first application 104(1) to execute the application extension 112 within the context of the collaboration object 108. For example, in the context of the collaboration object 108 being a virtual meeting and the second application 104(2) being a notetaking application, the execution of the application extension 112 by the first application 104(1) may expose notetaking functionalities of the notetaking application directly within the virtual meeting. In this way, each of the users that are participating in the virtual meeting are enabled to collaboratively edit content of the data file 124 within the context of the virtual meeting using notetaking functionalities that are extended into the virtual meeting via the application extension 112. The file pointer 114 that is illustrated within the collaboration object 108 may point to the data file 124 (e.g., identify a unique path to the data file 124 in a file system maintained by the collaboration platform 102).

Generally described, the file system is configured to facilitate and/or perform operations in association with stored files (e.g., open a file, delete a file, write to a file, read from a file, replace a file, copy a file, move a file, search for a file, create a file, etc.). There are a variety of different file systems, some of which can be designed to be used for specific applications or specific operating systems executing on a host system. A file system is typically configured as a hierarchical structure that includes nodes representing directories and/or files. Moreover, a file system comprises logic that enables navigation through the nodes to locate a file (e.g., a document, an executable, a spreadsheet, an image, a video, etc.) and to perform an operation in association with the file. In some instances, a file system may maintain object permissions data 120 as described below.

Based on the instruction 128, the first application 104(1) may generate update data 126 that is configured to update the user account data 116 to indicate that each user defined by the group definition 110 for the collaboration object 108 is permitted to access the data file 124. For illustrative purposes, object permissions data 120 that corresponds to the data file 124 is shown with check-marks indicating that account permissions for each of the first user account, the second user account, and the Nth user account permit access to the data file 124. For purposes of the present discussion, presume that at least some of these user accounts were not permitted to access the data file 124 prior to the instruction 128 being generated to associate the data file 124 with the collaboration object 108.

The collaboration platform 102 may then provide aspects of the update data 126 to the second application 104(2) which may update application configuration parameters 122 to reflect the object permissions data 120 as updated based on the instruction 128. The application configuration parameters 122 may control aspects of a user experience presented by the user-specific instances 134 of the second application 104(2) at each of the user devices 130. For example, the application configuration parameters 122 for each user account may dictate a listing of data files that are presented by each of the user-specific instances 134 of the second application 104(2).

As illustrated, the collaboration platform 102 transmits instances of the application configuration parameters to each instance 134 of the second application 104(2) that corresponds to the users identified in the group definition 110 for the collaboration object 108. It will be appreciated that the transmitted instances of the application configuration parameters may be transmitted as a result of the instruction 128 causing the object permission data 120 to be updated to indicate that user accounts defined by the group definition 110 are permitted to access the data file 124. Here, first application configuration parameters 122(1) are sent to the first user device 130(1), second application configuration parameters 122(2) are sent to the second user device 130(2), and Nth application configuration parameters 122(N) are sent to the first user device 130(N). Notably, due to the third user account being omitted from the group definition, application configuration parameters are not generated for and transmitted to the third user device 130(3). In some embodiments, the application configuration parameters 122 transmitted to each user device 130 associated with the group definition 110 cause the respective instances 134 of the second application 104(2) to include the file pointer 114 that points to the data file 124. In this way, the transmitted instances of the application configuration parameters may cause each user-specific instance 134 of the second application 104(2) to render a user interface element that is configured to provision access to the content of the data file 124 that has been associated with the collaboration object 108 based on the instruction 128 received via the first application 104(1). Thus, the techniques described herein enable each of the users within the user group for the collaboration object 108 to access the data file 124 via both of the collaboration object 108 (that is accessible by the entire user group) and their own user-specific instance 134 of the second application 104(2). In this way, users are seamlessly enabled to access content that was edited via the application extension being executed by the first application in association with the collaboration object directly via their own user-specific stand-alone instance 134 of the second application 104(2) operating on their user device 130.

In some embodiments, the data file 124 may be generated as a result of the instruction 128 being received via the first application 104(2). For example, during a virtual call the participants may decide to collaboratively generate content using the second functionalities of the second application 104(2). Thus, one of the participants may select an icon or user interface element that extends the second application 104(2) into the virtual call. Selection of the icon may result in the instruction 128 being sent to the first application 104(1) and may trigger the first application 104(1) to being executing the application extension 112 (e.g., a plug-in) in association with the virtual call. This may result in a function tray of the second application 104(2) being displayed to all of the participants in the context of the virtual call. Selection of the icon may also cause the collaboration platform 102 to generate the data file 124 in storage that is accessible by each of the first application 104(1) and the second application 104(2). Selection of the icon may also cause the collaboration platform 102 to provide the file pointer to the first application 104(1).

In some embodiments, the file pointer 114 points to a single data file 124 that is shared by and accessible to all of the user accounts included in the group definition 110. For example, the instruction 128 may trigger generation of a single notetaking file or whiteboard file and each instance 134 of the second application for user accounts in the group definition 110 point to the same file. In this way, all of the users within the group may see all of the others users' inputs to the single data file. Additionally, or alternatively, the instruction 128 may cause the collaboration platform 102 to a plurality of user-specific instances of the data file in association with the plurality of user accounts included within the group definition. Then, the application configuration parameters 122 may cause individual instances 134 of the second application to provision individual user accounts, of the plurality of user accounts, with access to individual user-specific instances of the data file initially shared via the instruction 128. In this way, each user may start off with the same content but may mark it up as she sees fit to generate her own content in accordance with her own preferences.

Figure 2:
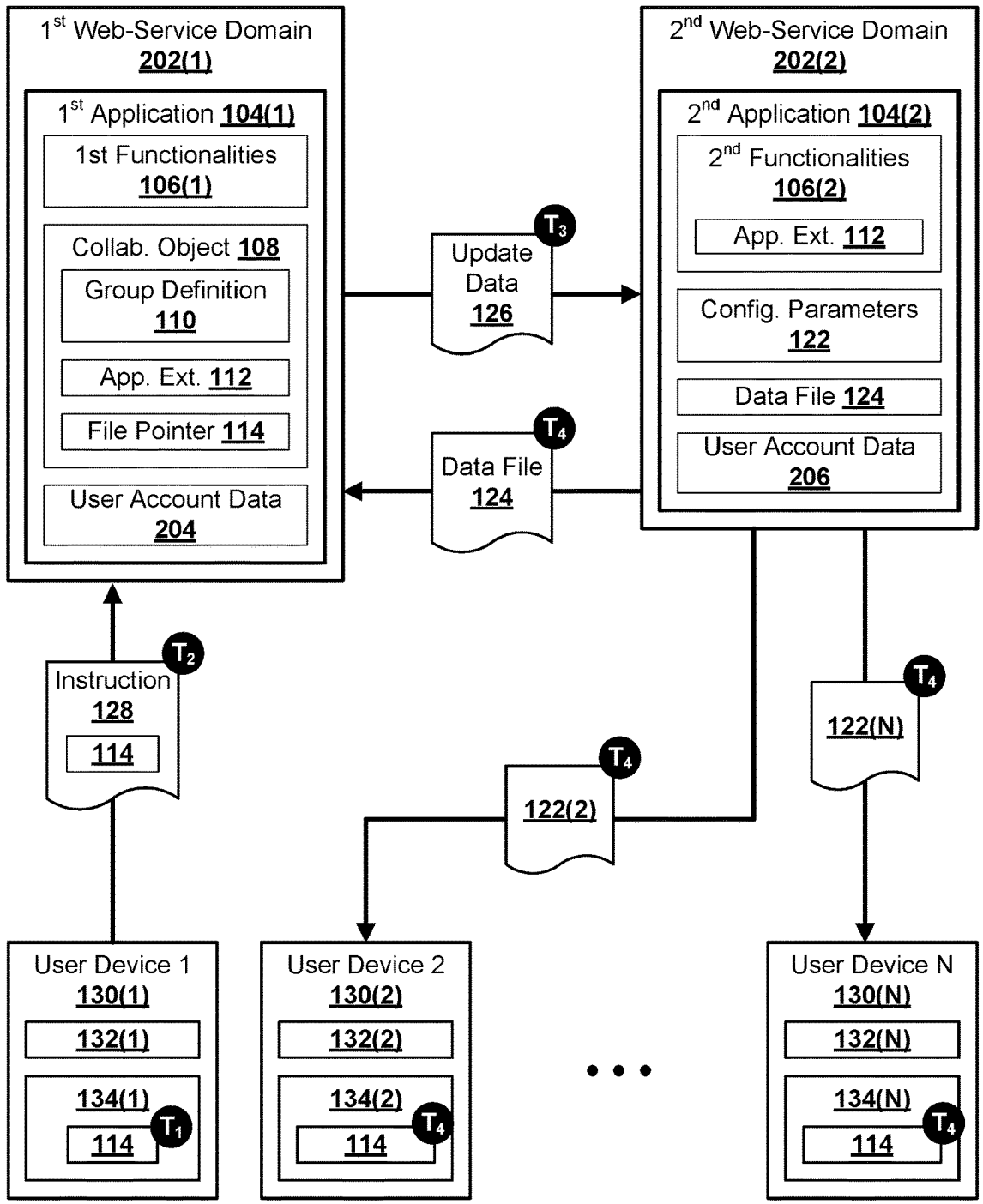
FIG. 2 is a system diagram illustrating an example environment in which a data file being accessed via a collaboration object of a first web-service domain results in the data file becoming accessible to a user group via a second web-service domain.

Turning now to FIG. 2, illustrated is a system diagram illustrating an example environment 200 in which a data file 124 being accessed via a collaboration object 108 of a first web-service domain 202(1) results in the data file 124 becoming accessible to a user group via a second web-service domain 202(1). The first web-service domain 202(1) may include one or more servers that implement aspects of a first application 104(1) that provides a set of first functionalities 106(1). For example, the first application 104(1) may facilitate a collaboration object 108 between a group of users defined by a group definition 110. The collaboration object 108 may be a prescheduled virtual meeting for which meeting invitations are sent to the group of users, an impromptu virtual call between the group of users (e.g., one user may call the others without prescheduling the event), a channel, a chat, an email thread, and so on.

The second web-service domain 202(2) may be provide third-party services that are extendable into the first application 104(1) via an application extension 112 that is executable by the first web-service domain 202(1). For example, the second web-service domain 202(2) may include one or more servers that implement aspects of a second application 104(2) that provides a set of second functionalities 106(2). Execution of the application extension 112 by the first application 104(1) may expose the second functionalities 106(2) to the group of users within the context of the collaboration object 108. For example, under circumstances where the first application 104(1) is a web-conferencing application and the second application 104(2) is a data analytics application, execution of the application extension during a virtual communication session may enable the participants of the virtual communication session to collaboratively utilize data analytics functionalities provided by the second application 104(2) within the context of the virtual communication session.

With respect to the data flow scenario of FIG. 2, at time $T_1$ each of the first user device 130 through the Nth user device 130(N) may be operating respective instances 132 of the first application 104(1) in association the collaboration object 108. For example, the instances 132 may be facilitating a communication session between the users of each of the first through Nth user device.

At time $T_2$ while communicating via the collaboration object 108, the first user may generate an instruction 128 to cause the first application 104(2) to begin running the application extension 112 to extend the $2^{nd}$ functionalities 106(2) from the second web-service domain 202(2) into the collaboration object 108. For example, in the context of the collaboration object 108 being the communication session, the first user may select an icon, representing the second application 104(2), that is presented by the first instance 132(1). In the illustrated example, the first user already has access to the data file 124 and time $T_1$ and therefore a file pointer 114 may already reside within her user-specific instance 134 of the second application 104(2). Furthermore, the first user provides an indication of the file pointer 114 within the instruction 128 to inform the first application 104(1) that is operating in the first web-service domain 202(1) of which specific data file is to be accessed from the second web-service domain 202(2) and shared via the collaboration object 108.

At time $T_3$, the first web-service domain 202(1) transmits update data 126 to the second web-service domain 202(2) to inform the second web-service domain 202(2) that the first user has elected to share the data file 124 with the group of users for the collaboration object 108. In some embodiments, the update data 126 may cause the second web-service domain 202(2) to update application configuration parameters 122 to reflect that the group of users associated with the collaboration session 106 have been granted access to the data file 124 identified within the instruction 128.

Then, at time $T_4$, the second web-service domain 202(2) may transmit instances of application configuration parameters 122 to at least some of the user devices 130 that belong or correspond to the users defined by the group definition 110. In some embodiments, one or both of the web-service domains 202 may map user account data 204 for the first application 104(1) with user account data 206 for the second application 104(2) to identify which users within the group have subscriptions already associated with respective instances 134 of the second application 104(2). As illustrated, receipt of the second instance 122(2) and Nth instance 122(N) of the application configuration parameters cause the second instance 134(2) and Nth instance 134(N) of the second application 104(2) to also include the file pointer 114. Thus, as a result of the first user sharing the data file 124 into the collaboration object 108, the instances 134 of the second application 104(2) may be automatically updated to provide the other users with who the data file is shared with seamless access to the data file 124 via a completely different application that the one within which the file was shared by the first user. It can be appreciated therefore that the techniques described herein facilitate synchronization of shared data files across different applications—even when those applications are provided by separate web service entities that operate different web-service domains 202.

Figure 3:
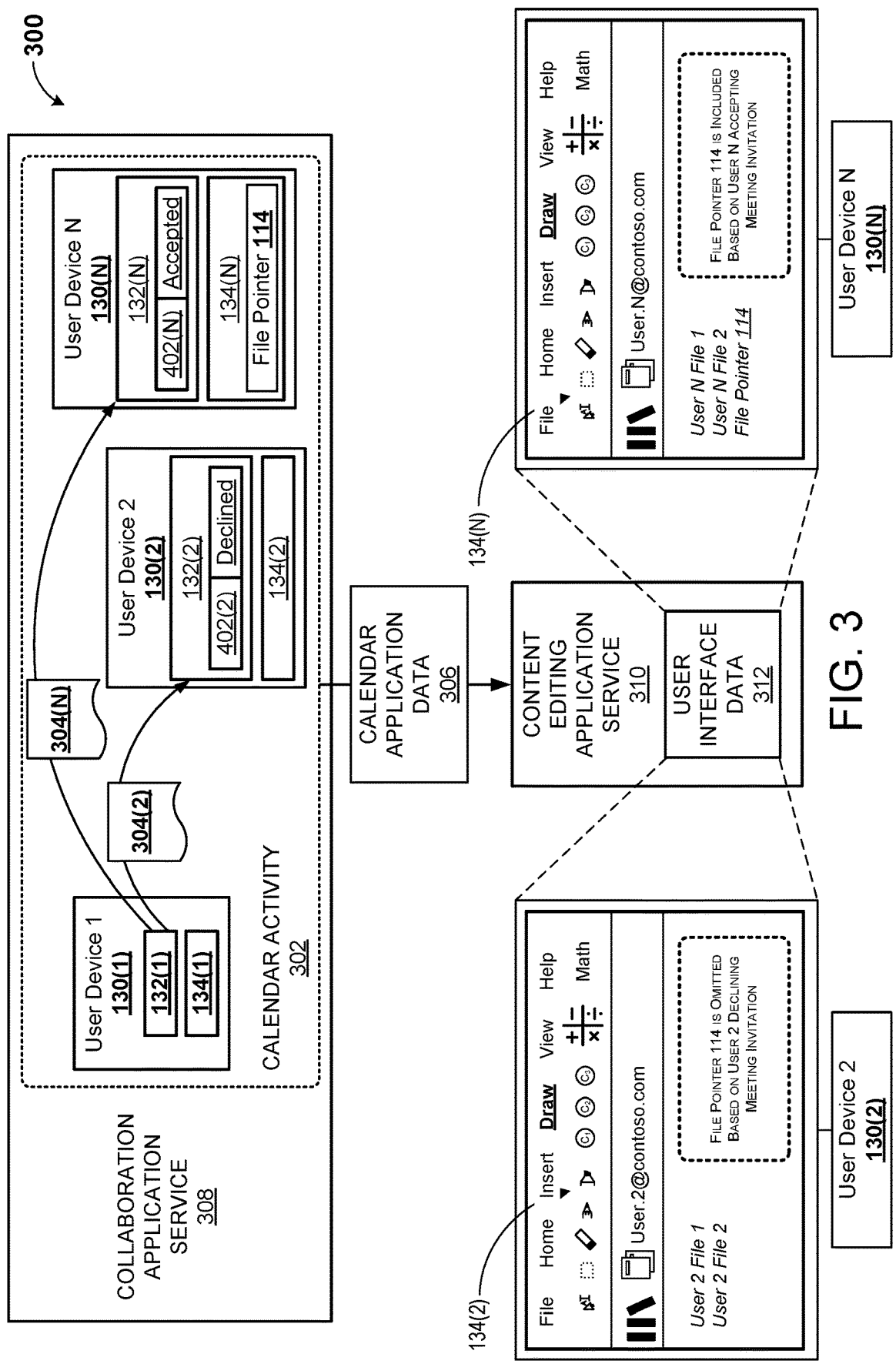
FIG. 3 is a system diagram illustrating an example environment in which calendar activity that occurs in association with instances of a first application results in data content being selectively added to instances of a second application.

Turning now to FIG. 3, illustrated is a system diagram illustrating an example environment 300 in which calendar activity 302 that occurs in association with instances 132 of a first application results in data content being selectively added to instances 134 of a second application. As a specific example, a file pointer 114 that is identified within the meeting invitations 304 and that points to a specific file (e.g., within an online storage location) may be added to user-specific instances 134 of a second application in response to individual users being sent an electronic invitation 304 via instances 132 of a first application.

In the illustrated example, the calendar activity 302 includes invitations 304 being generated via a first user-specific instance 132(1) of a first application. The calendar activity 302 further includes the generated invitations 304 being transmitted over one more networks and received by a second user-specific instance 132(2) of the first application and a third user-specific instance 132(3) of the first application. In some embodiments, user response data that is generated via the second instance 132(2) or the Nth instance 132(N) of the first application may control application configuration data corresponding to the second instance 134(2) or the Nth instance 134(N) of the second application, respectively. For example, application configuration data may be generated based on whether a user accepts an invitation 304, tentatively accepts an invitation 304, responds to a meeting invitation by proposing a new time, declines a meeting invitation, or so on.

A collaboration application service 308 may generate calendar application data 306 based on the calendar activity 302. The collaboration application service 308 may then transmit the calendar application data 306 to a content editing application service 310 which may then generate user interface data 312 based thereon. Generally described, the user interface data 312 may control aspects of a user experience that is generate via individual ones of the instances 134 of the second application. In the illustrated example, the calendar activity data 302 includes the second user declining the second meeting invitation 304(2) via the second instance 132(2) of the first application. As a result of the second user declining the second meeting invitation 304(2), the user interface data 312 causes the second instance 134(2) that is displayed via the second user device 130(2) to omit the file pointer 114 to the data file 124 that is identified within the second meeting invitation 304(2). As shown, the calendar activity data 302 further includes the Nth user accepting the Nth meeting invitation 304(N) via the Nth instance 132(N) of the first application. As a result of the Nth user accepting the Nth meeting invitation 304(N), the user interface data 312 causes the Nth instance 134(N) that is displayed via the Nth user device 130(N) to include a graphical user interface element that is associated with the file pointer 114 to the data file 124 that is identified within the Nth meeting invitation 304(N). In this way, the techniques described herein facilitate seamless integration of data content that is shared within calendar objects generated via a first application into a user experience for invitees of the calendar objects within a separate application.

FIGS. 4A through 4E illustrate various aspects of exemplary GUIs that can be displayed in association with the technologies described herein. FIGS. 4A through 4E are described below in the context of a sequence of operations resulting in various application configuration changes to user-specific instances of a collaboration application and a content editing application.

Figure 4A:
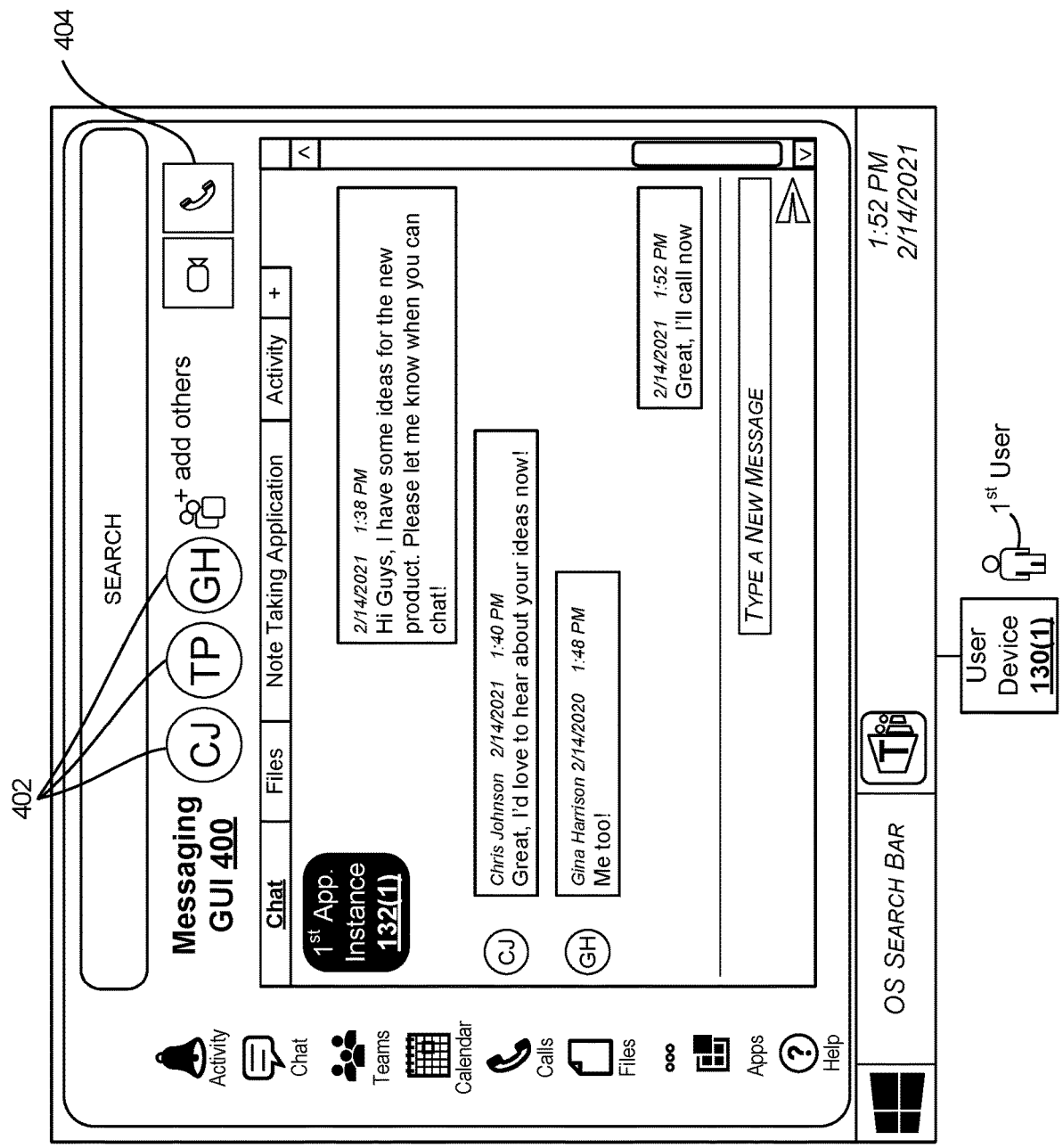
FIGS. 4A through 4E illustrate various aspects of exemplary GUIs that can be displayed in association with the technologies described herein.

FIG. 4A illustrates an exemplary messaging GUI 400 that can be presented to a first user in association with the collaboration application. As illustrated, the messaging GUI 400 corresponds to a message thread between a group of three users. Furthermore, the messaging GUI 400 corresponds to a user-specific instance 132, of the collaboration application, that is being run on a first user device 130(1). The messaging GUI 400 includes a message generation field for typing and/or dictating message content in association with a persistent workplace chat as shown represented. Thus, by using the message generation field, a user may generate and transmit messages in association with the persistent workplace chat so that any other members of this persistent workplace chat receive and retain continued access to such messages. Exemplary such persistent workplace chats include, but are not limited to, a conversation thread within the MICROSOFT TEAMS collaboration platform, a SLACK conversation object, or any other type of multi-user persistent chat system.

For purposes of the present example, the messaging GUI 400 identifies the group definition 110 for the collaboration object of the message thread. Specifically, a set of graphical elements 402 identify each user that is included within the message thread. The messaging GUI 400 further includes a user interface element 404 that enables one or more users to initiate a virtual call between the entire group of users that are included within the group definition. To fully convey a contemplated use case scenario of the techniques described herein, the illustrated example shows a sequence of messages leading up to a virtual call that is facilitated by the collaboration application.

Figure 4B:
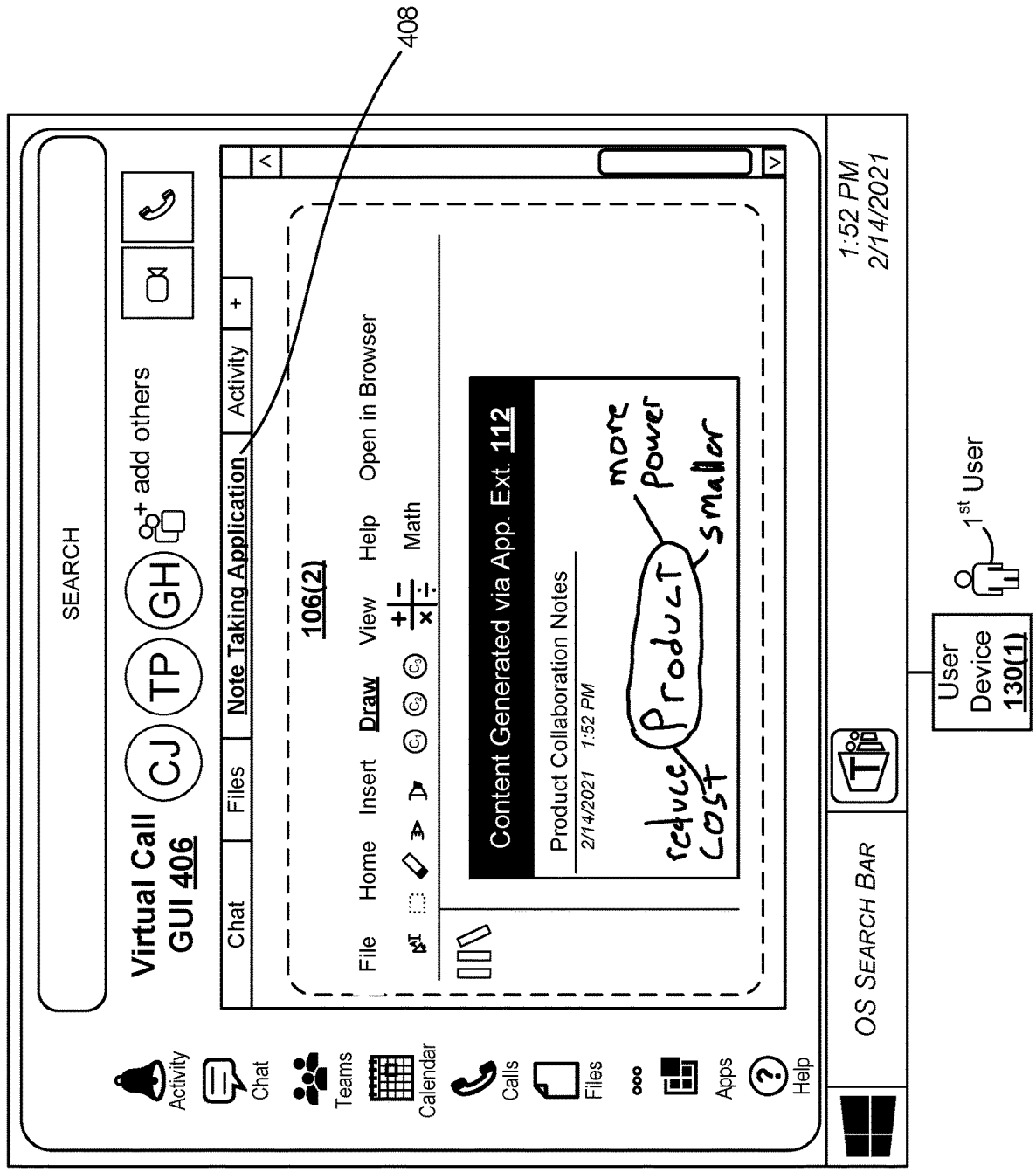

FIG. 4B illustrates an exemplary virtual call GUI 406 that can be presented to the first user in association with the collaboration application. As illustrated, the virtual call GUI 406 corresponds to a live virtual call between the group of three users of the message thread. The live virtual call may be initiated as a result of the first user selecting the user interface element 404. Then, during the virtual call, the first user may further select a user interface element 408 that causes the collaboration application to utilize an application extension 112 to expose the second functionalities 106(2) associated with a content editing application. In this way, the application extension 112 enables the group of users that are associated with a collaboration object (e.g., participants of a virtual call, members of a message thread, etc.) to implement the second functionalities 106(2) of the content editing application while collaboratively viewing content of that application within the context of the collaboration object 108. For example, as illustrated, the virtual call GUI 406 is displaying a set of graphical user interface elements that are selectable to implement the second functionalities 106(2) and are arranged in accordance with a layout of the content editing application.

Figure 4C:
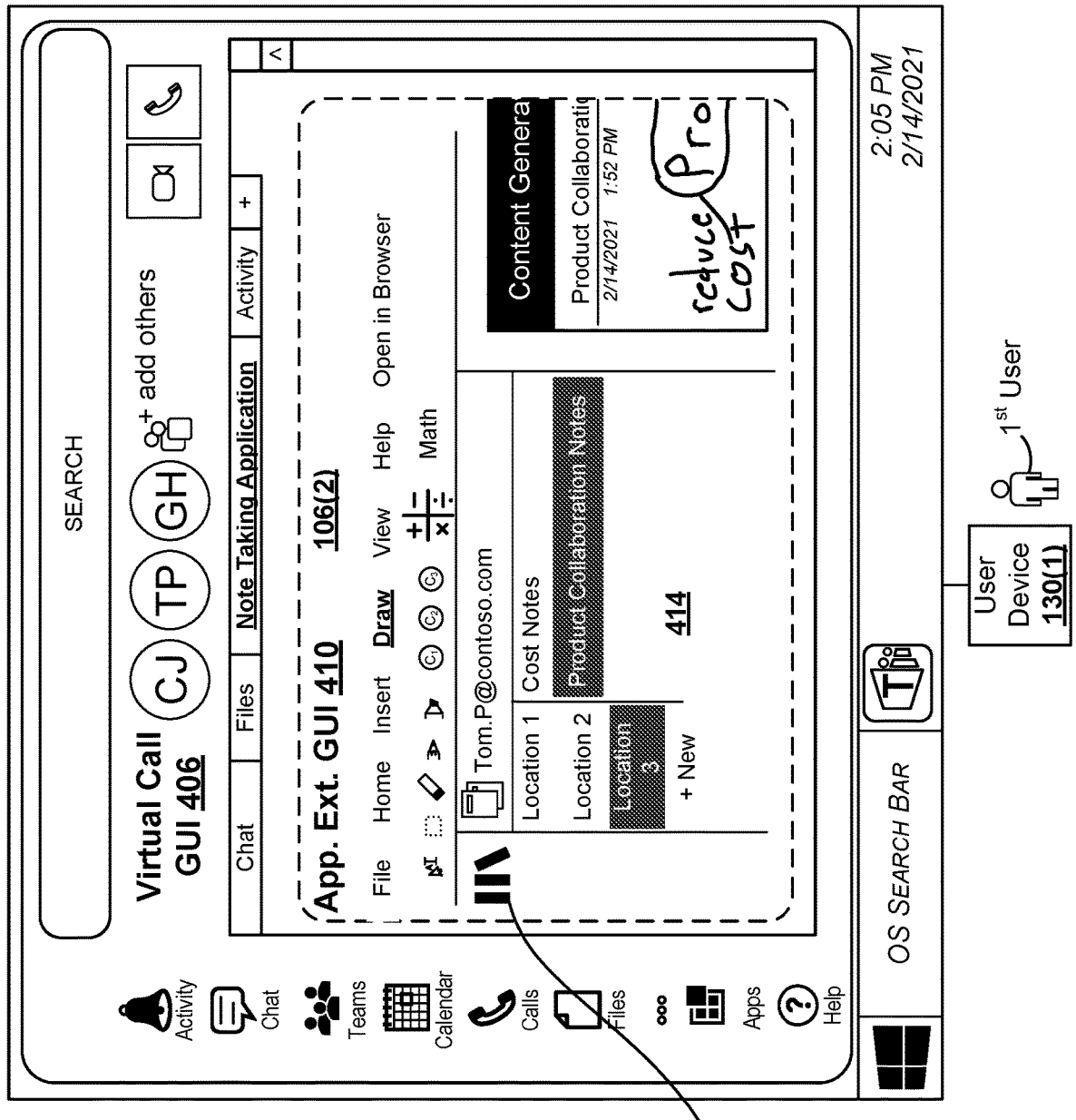

FIG. 4C illustrates an exemplary application extension GUI 410 that is configured to enable a user to define directory location data for content being generated via the application extension 112 directly through the virtual call GUI 406. As illustrated, the first user has selected a graphical user interface element 412 that is displayed within the application extension GUI 410 in order to expose an organizational structure of the content editing application. For example, as shown, the displayed organizational structure includes various directory locations that exist within the first user's instance 134(1) of the content editing application. As further illustrated, the application extension GUI 410 also enables the user to select from existing locations (e.g., location 1, location 2, and location 3) and/or to generate a new location within his existing organizational structure for the content editing application. As described below, the first user's selection of a directory location for content being edited via the application extension GUI 410 that is shown within the collaboration object GUI may control where the content appears in both his instance 134(1) of the content editing application as well as other participants instances 134.

Figure 4D:
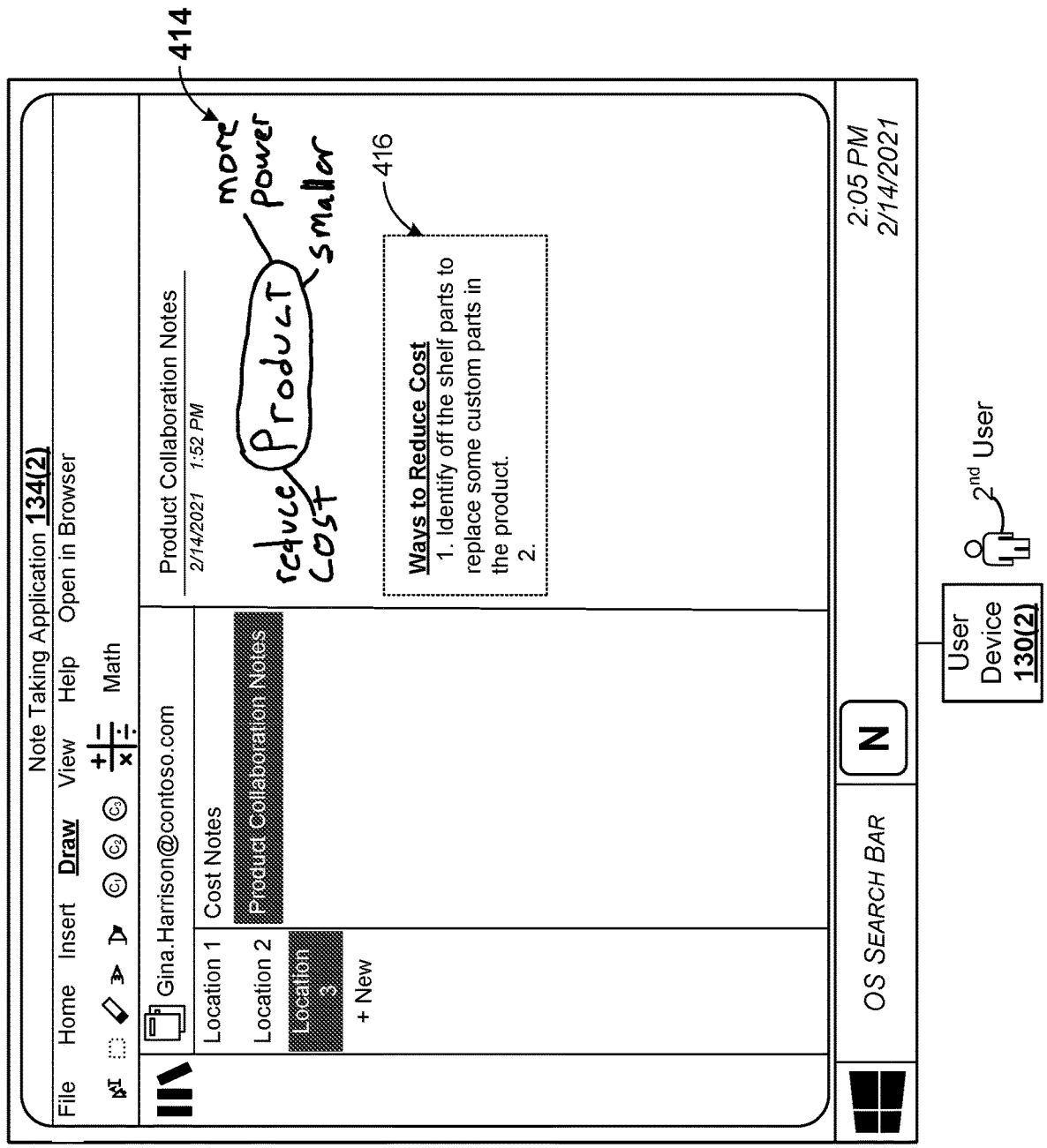

FIG. 4D illustrates an exemplary GUI 414 that corresponds to the second user's instance 134(2) of the content editing application. The GUI 414 illustrates that as a result of the first user deploying the application extension 112 to share content with the group within the collaboration application (e.g., during a virtual call or any other collaboration object for that matter) the shared content automatically is compiled into the user-specific instances 134 of the content editing application for the entire group. Additionally, as shown the content may be synchronized to the same directory location for the entire group within the content editing application based on the directory location data generated via the application extension 112 directly through the collaboration application.

As shown in FIG. 4D, the GUI 414 that corresponds to the second user's instance 134(2) of the content editing application enables the second user to generate and/or modify content that is shared via the collaboration object directly via the content editing application. Here, the second user has added the content shown in the box 416 into the content via the instance 134(2) during the virtual call.

Figure 4E:
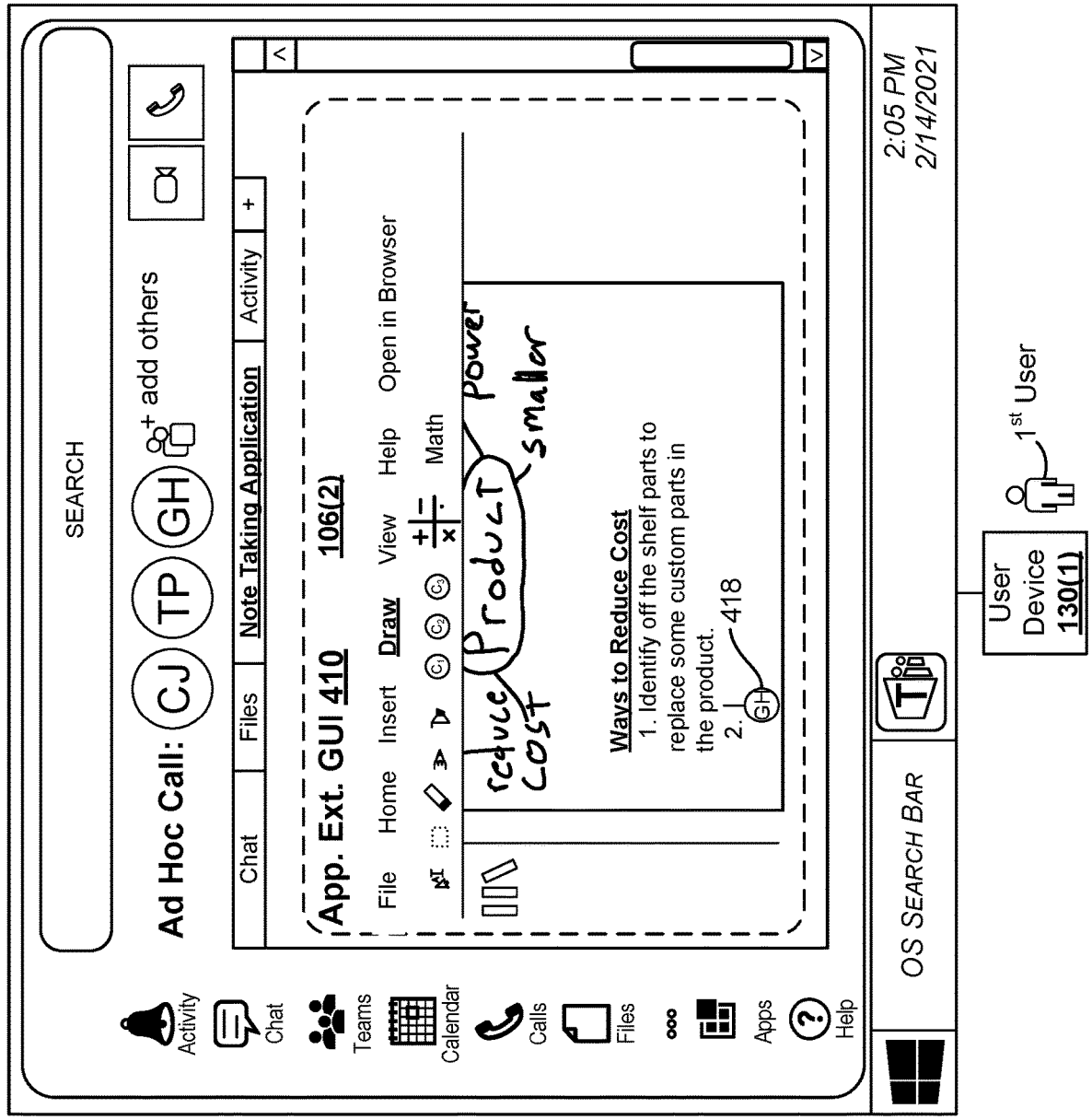

As shown in FIG. 4E, the second user's input via the instance 134(2) during the virtual call causes the application extension GUI 410 of the first user's instance 132(1). Furthermore, the application extension GUI 410 may include a status indicator 418 indicating which user (e.g., the second user in this case) is modifying content at specific locations within the data file.

Figure 5:
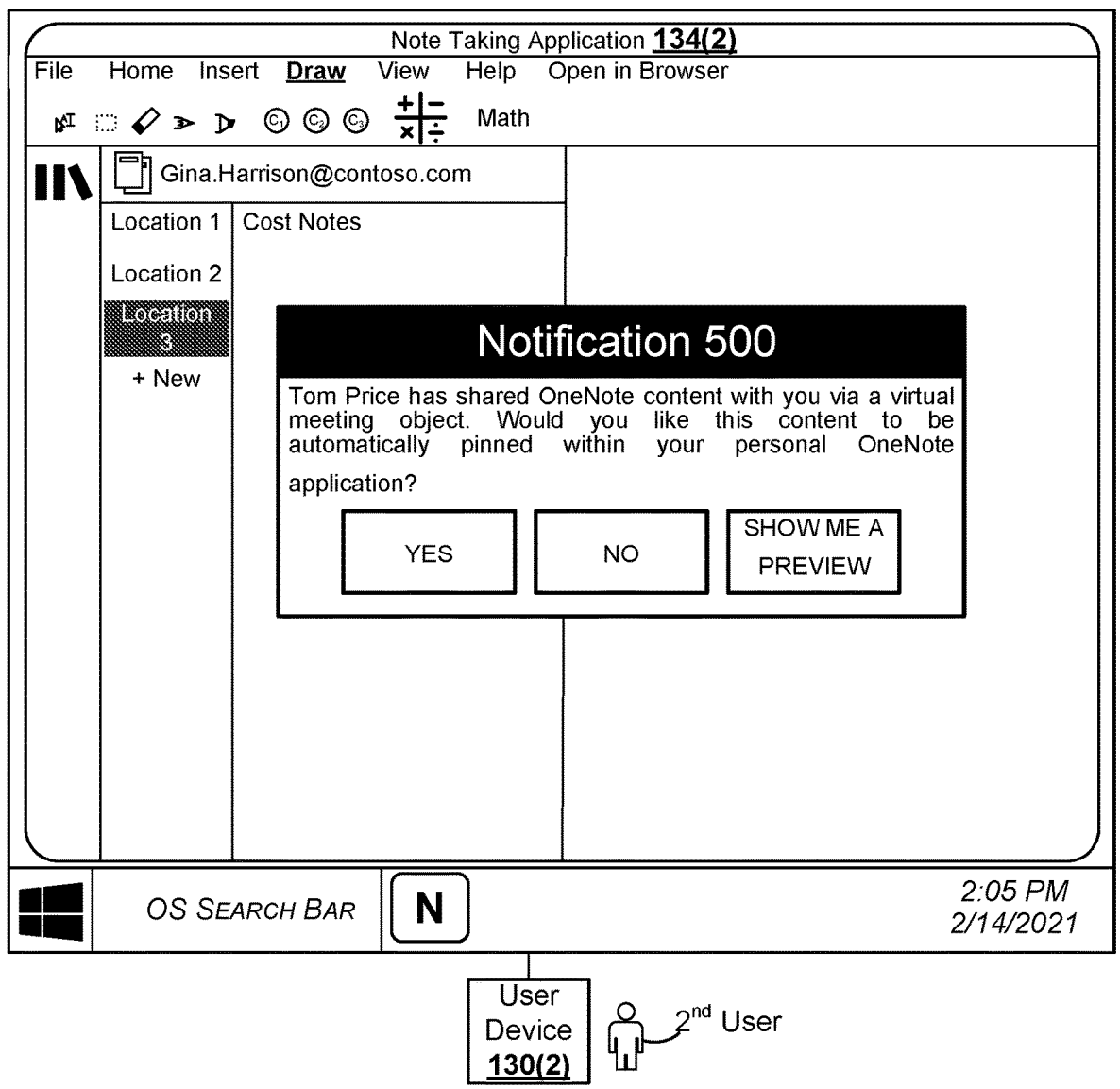
FIG. 5 illustrates an exemplary notification that may be displayed in response to content for a second application being shared with a user via a collaboration object of a first application.

FIG. 5 illustrates an exemplary notification 500 that may be displayed in response to content for a second application being shared with a user via a collaboration object of a first application. In the illustrated example, the notification 500 is displayed in association with an instance of the second application that uniquely corresponds to the user that the content has been shared with. As illustrated, the notification 500 includes a message that is designed to inform the user that content has been shared with them by another user via a virtual meeting object. For example, the content may be shared in an ad hoc manner during the virtual meeting. As another example, the content may be shared with them via a meeting invitation for a yet to occur pre-scheduled meeting.

In some embodiments, the notification 500 may provide the recipient user with one or more options to select between. For example, as illustrated, the notification 500 informs the recipient user (i.e., the user with whom content is shared by another user) the name of the other user that has shared content with them. Specifically, the notification 500 states "Tom Price has shared OneNote content with you via a virtual meeting object." Furthermore, the notification 500 may inquire whether the recipient user would like to have the content that has been shared with them pinned to their instance of the second application. For example, the illustrated notification 500 states "Would you like this content to be automatically pinned within your personal OneNote application?" As further illustrated, the notification 500 provides the recipient user with options to: (i) accept having their user-specific instance of the second application updated based on the content that is shared (e.g., by selecting the "YES" button), (ii) decline having their user-specific instance of the second application updated based on the content that is shared (e.g., by selecting the "NO" button), or (iii) electing to preview the content (e.g., by selecting the "SHOW ME A PREVIEW" button) prior to accepting or declining the option of having their user-specific instance of the second application updated based on the content that is shared.

Figure 6:
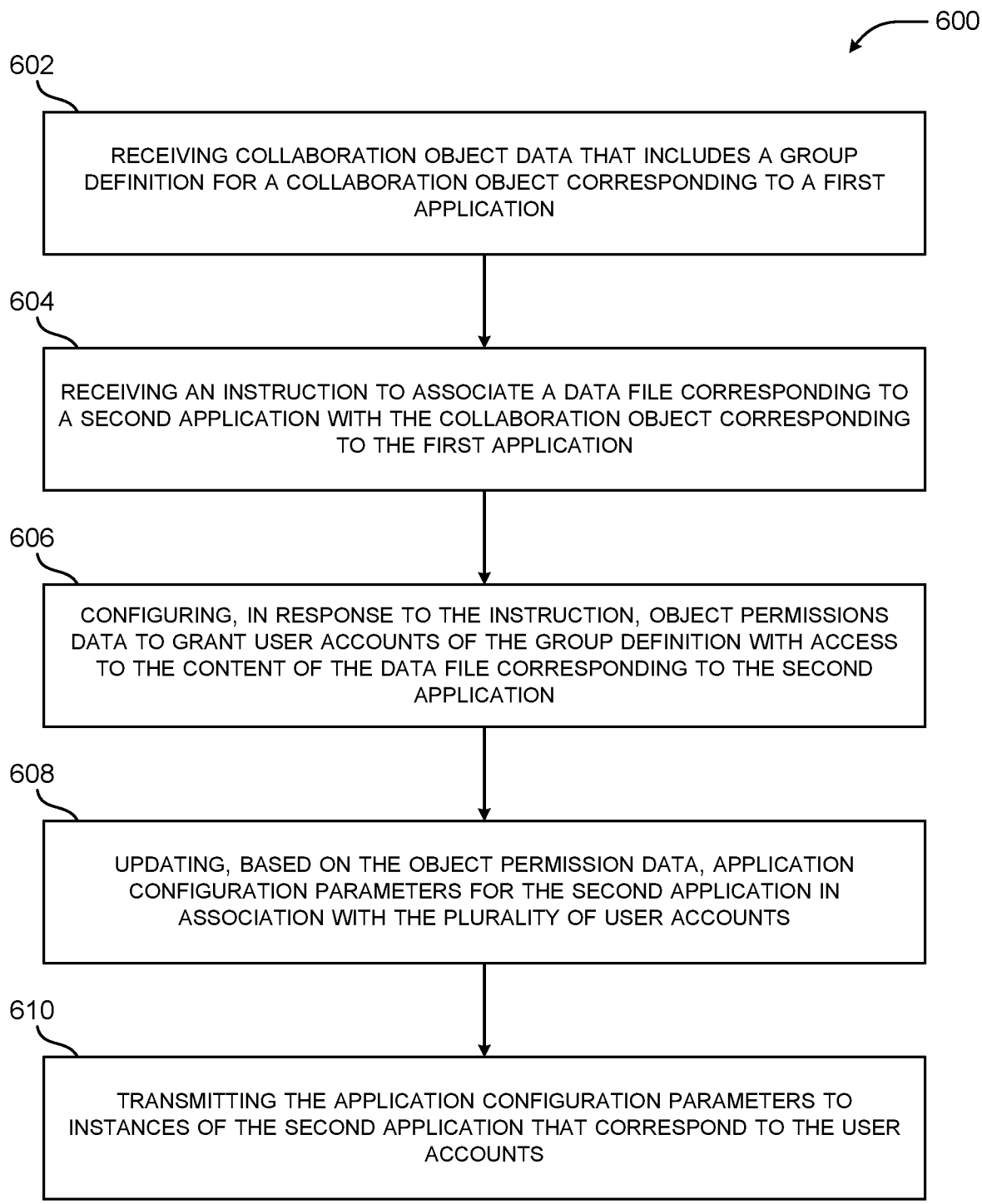
FIG. 6 is a diagram illustrating aspects of a routine for responding to content being associated with a collaboration object of a first application by automatically configuring user-specific instances of a second application for a group of users associated with the collaboration object.

FIG. 6 is a diagram illustrating aspects of a routine 600 for responding to content being associated with a collaboration object of a first application by automatically configuring user-specific instances of a second application for a group of users associated with the collaboration object. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 6 and the other figures can be implemented in association with the example presentation UIs described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, persistent chat sessions, video streams, images, virtual objects, and/or applications associated with a communication session.

The routine 600 starts at operation 602, where a system receives collaboration object data that includes a group definition for a collaboration object corresponding to a first application. The collaboration object may be a chat, a communication session, a virtual call, a prescheduled meeting, an email thread, and various other types of collaboration objects that are designed to facilitate collaborative communications between a group of users.

The routine 600 proceeds to operation 604, where the system receives an instruction to associate a data file, corresponding to a second application, with the collaboration object corresponding to the first application. In some embodiments, the instruction causes the first application to provide access to content of the data file in association with the collaboration object via an application extension of the second application that is executable by the first application.

The routine 600 proceeds to operation 606, where the system configures, in response to the instruction, object permissions data to grant a plurality of user accounts identified by the group definition with access to the content of the data file corresponding to the second application.

The routine 600 proceeds to operation 608, where the system updates, based on the object permission data, application configuration parameters for the second application in association with the plurality of user accounts.

The routine 600 proceeds to operation 610, where the system transmits the application configuration parameters to instances of the second application that correspond to the plurality of user accounts.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 7:
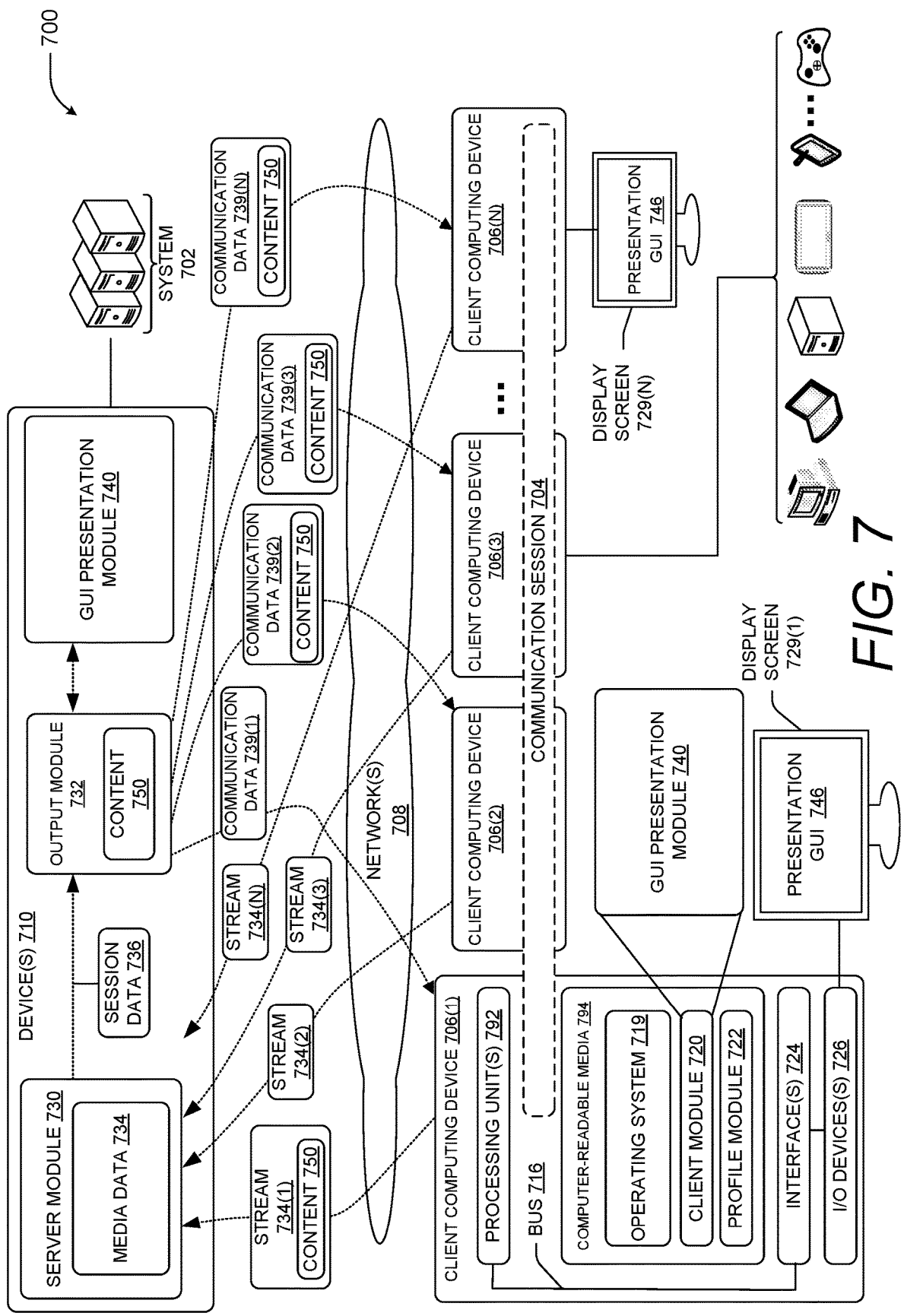
FIG. 7 is a diagram illustrating an example environment in which a system can implement the techniques disclosed herein.

FIG. 7 is a diagram illustrating an example environment 700 in which a system 702 can implement the techniques disclosed herein. In some implementations, a system 702 may function to collect, analyze, and share data defining one or more objects that are displayed to users of a communication session 1004.

As illustrated, the communication session 703 may be implemented between a number of client computing devices 706(1) through 706(N) (where N is a number having a value of two or greater) that are associated with or are part of the system 702. The client computing devices 706(1) through 706(N) enable users, also referred to as individuals, to participate in the communication session 703.

In this example, the communication session 703 is hosted, over one or more network(s) 708, by the system 702. That is, the system 702 can provide a service that enables users of the client computing devices 706(1) through 706(N) to participate in the communication session 703 (e.g., via a live viewing and/or a recorded viewing). Consequently, a "participant" to the communication session 703 can comprise a user and/or a client computing device (e.g., multiple users may be in a room participating in a communication session via the use of a single client computing device), each of which can communicate with other participants. As an alternative, the communication session 703 can be hosted by one of the client computing devices 706(1) through 706(N) utilizing peer-to-peer technologies. The system 702 can also host chat conversations and other team collaboration functionality (e.g., as part of an application suite).

In some implementations, such chat conversations and other team collaboration functionality are considered external communication sessions distinct from the communication session 703. A computing system 702 that collects participant data in the communication session 703 may be able to link to such external communication sessions. Therefore, the system may receive information, such as date, time, session particulars, and the like, that enables connectivity to such external communication sessions. In one example, a chat conversation can be conducted in accordance with the communication session 703. Additionally, the system 702 may host the communication session 703, which includes at least a plurality of participants co-located at a meeting location, such as a meeting room or auditorium, or located in disparate locations.

In examples described herein, client computing devices 706(1) through 706(N) participating in the communication session 703 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 703 live as activity occurs, or alternatively, via a recording at a later time after the activity occurs. In examples described herein, client computing devices 706(1) through 706(N) participating in the communication session 703 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 702 of FIG. 7 includes device(s) 710. The device(s) 710 and/or other components of the system 702 can include distributed computing resources that communicate with one another and/or with the client computing devices 706(1) through 706(N) via the one or more network(s) 708. In some examples, the system 702 may be an independent system that is tasked with managing aspects of one or more communication sessions such as communication session 703. As an example, the system 702 may be managed by entities such as SLACK, WEBEX, GOTOMEETING, GOOGLE HANGOUTS, etc.

Network(s) 708 may include, for example, public networks such as the Internet, private networks such as an institutional and/or personal intranet, or some combination of private and public networks. Network(s) 708 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 708 may utilize communications protocols, including packet-based and/or datagram-based protocols such as Internet protocol ("IP"), transmission control protocol ("TCP"), user datagram protocol ("UDP"), or other types of protocols. Moreover, network(s) 708 may also include a number of devices that facilitate network communications and/or form a hardware basis for the networks, such as switches, routers, gateways, access points, firewalls, base stations, repeaters, backbone devices, and the like.

In some examples, network(s) 708 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.7 standards (e.g., 802.7g, 802.7n, 802.7ac and so forth), and other standards.

In various examples, device(s) 710 may include one or more computing devices that operate in a cluster or other grouped configuration to share resources, balance load, increase performance, provide fail-over support or redundancy, or for other purposes. For instance, device(s) 710 may belong to a variety of classes of devices such as traditional server-type devices, desktop computer-type devices, and/or mobile-type devices. Thus, although illustrated as a single type of device or a server-type device, device(s) 710 may include a diverse variety of device types and are not limited to a particular type of device. Device(s) 710 may represent, but are not limited to, server computers, desktop computers, web-server computers, personal computers, mobile computers, laptop computers, tablet computers, or any other sort of computing device.

A client computing device (e.g., one of client computing device(s) 706(1) through 706(N)) (each of which are also referred to herein as a "data processing system") may belong to a variety of classes of devices, which may be the same as, or different from, device(s) 710, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 706(1) through 706(N) of the various classes and device types can represent any type of computing device having one or more data processing unit(s) 792 operably connected to computer-readable media 794 such as via a bus 716, which in some instances can include one or more of a system bus, a data bus, an address bus, a PCI bus, a Mini-PCI bus, and any variety of local, peripheral, and/or independent buses.

Executable instructions stored on computer-readable media 794 may include, for example, an operating system 719, a client module 720, a profile module 722, and other modules, programs, or applications that are loadable and executable by data processing units(s) 792.

Client computing device(s) 706(1) through 706(N) may also include one or more interface(s) 724 to enable communications between client computing device(s) 706(1) through 706(N) and other networked devices, such as device (s) 710, over network(s) 708. Such network interface(s) 724 may include one or more network interface controllers (NICs) or other types of transceiver devices to send and receive communications and/or data over a network. Moreover, client computing device(s) 706(1) through 706(N) can include input/output ("I/O") interfaces (devices) 726 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 7 illustrates that client computing device 706(1) is in some way connected to a display device (e.g., a display screen 729(N)), which can display a UI according to the techniques described herein.

In the example environment 700 of FIG. 7, client computing devices 706(1) through 706(N) may use their respective client modules 720 to connect with one another and/or other external device(s) in order to participate in the communication session 703, or in order to contribute activity to a collaboration environment. For instance, a first user may utilize a client computing device 706(1) to communicate with a second user of another client computing device 706(2). When executing client modules 720, the users may share data, which may cause the client computing device 706(1) to connect to the system 702 and/or the other client computing devices 706(2) through 706(N) over the network (s) 708.

The client computing device(s) 706(1) through 706(N) may use their respective profile modules 722 to generate participant profiles (not shown in FIG. 7) and provide the participant profiles to other client computing devices and/or to the device(s) 710 of the system 702. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 7, the device(s) 710 of the system 702 include a server module 730 and an output module 732. In this example, the server module 730 is configured to receive, from individual client computing devices such as client computing devices 706(1) through 706(N), media streams 734(1) through 734(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 730 is configured to receive a collection of various media streams 734(1) through 734(N) during a live viewing of the communication session 703 (the collection being referred to herein as "media data 734"). In some scenarios, not all of the client computing devices that participate in the communication session 703 provide a media stream. For example, a client computing device may only be a consuming, or a "listening", device such that it only receives content associated with the communication session 703 but does not provide any content to the communication session 703.

In various examples, the server module 730 can select aspects of the media streams 734 that are to be shared with individual ones of the participating client computing devices 706(1) through 706(N). Consequently, the server module 730 may be configured to generate session data 736 based on the streams 734 and/or pass the session data 736 to the output module 732. Then, the output module 732 may communicate communication data 739 to the client computing devices (e.g., client computing devices 706(1) through 706(3) participating in a live viewing of the communication session). The communication data 739 may include video, audio, and/or other content data, provided by the output module 732 based on content 750 associated with the output module 732 and based on received session data 736.

As shown, the output module 732 transmits communication data 739(1) to client computing device 706(1), and transmits communication data 739(2) to client computing device 706(2), and transmits communication data 739(3) to client computing device 706(3), etc. The communication data 739 transmitted to the client computing devices can be the same or can be different (e.g., positioning of streams of content within a user interface may vary from one device to the next).

In various implementations, the device(s) 710 and/or the client module 720 can include GUI presentation module 740. The GUI presentation module 740 may be configured to analyze communication data 739 that is for delivery to one or more of the client computing devices 706. Specifically, the UI presentation module 740, at the device(s) 710 and/or the client computing device 706, may analyze communication data 739 to determine an appropriate manner for displaying video, image, and/or content on the display screen 729 of an associated client computing device 706. In some implementations, the GUI presentation module 740 may provide video, image, and/or content to a presentation GUI 746 rendered on the display screen 729 of the associated client computing device 706. The presentation GUI 746 may be caused to be rendered on the display screen 729 by the GUI presentation module 740. The presentation GUI 1146 may include the video, image, and/or content analyzed by the GUI presentation module 740.

In some implementations, the presentation GUI 746 may include a plurality of sections or grids that may render or comprise video, image, and/or content for display on the display screen 729. For example, a first section of the presentation GUI 746 may include a video feed of a presenter or individual, a second section of the presentation GUI 746 may include a video feed of an individual consuming meeting information provided by the presenter or individual. The GUI presentation module 740 may populate the first and second sections of the presentation GUI 746 in a manner that properly imitates an environment experience that the presenter and the individual may be sharing.

In some implementations, the GUI presentation module 740 may enlarge or provide a zoomed view of the individual represented by the video feed in order to highlight a reaction, such as a facial feature, the individual had to the presenter. In some implementations, the presentation GUI 746 may include a video feed of a plurality of participants associated with a meeting, such as a general communication session. In other implementations, the presentation GUI 746 may be associated with a channel, such as a chat channel, enterprise teams channel, or the like. Therefore, the presentation GUI 746 may be associated with an external communication session that is different than the general communication session.

Figure 8:
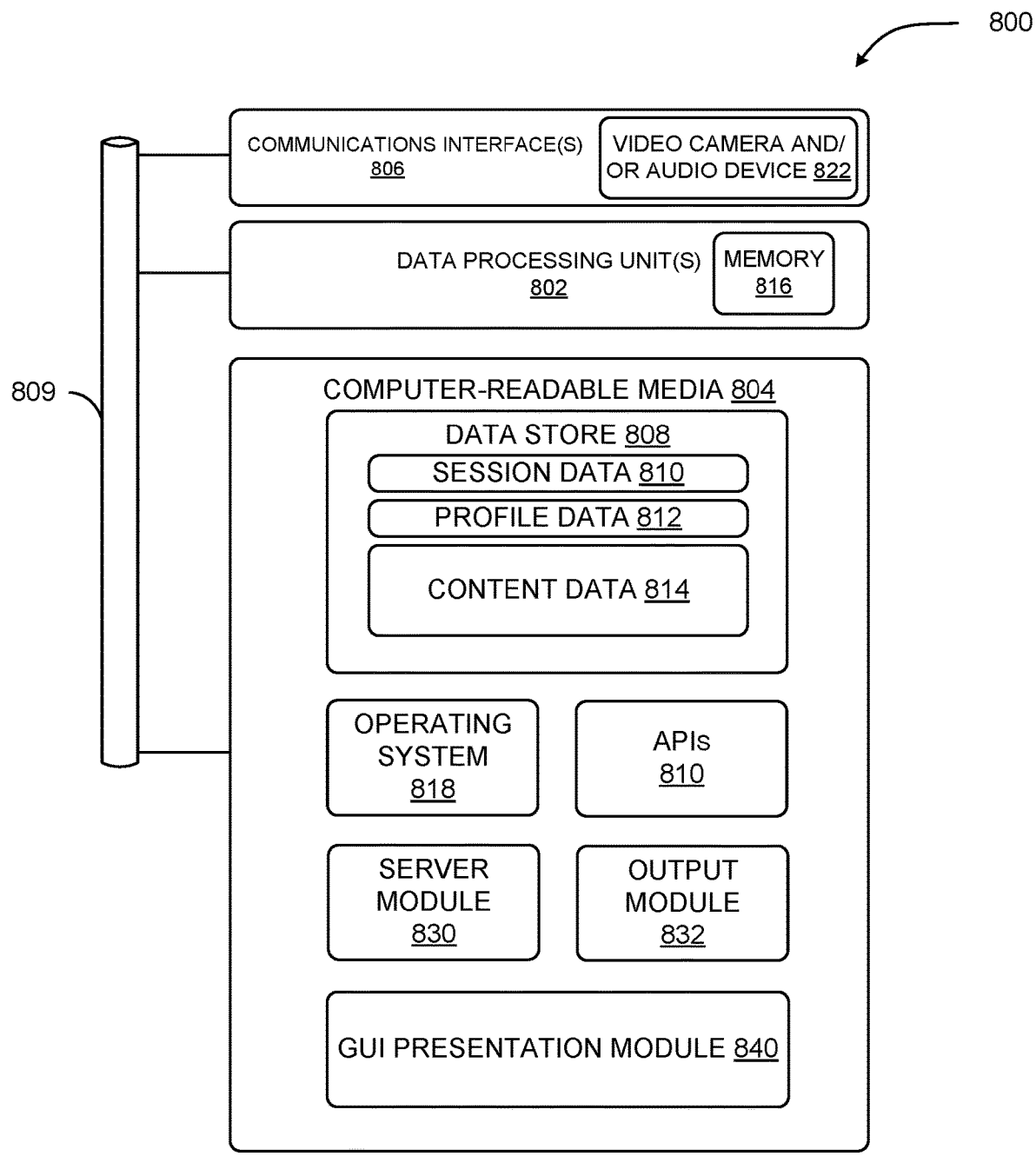
FIG. 8 illustrates a diagram that shows example components of an example device (also referred to herein as a "computing device") configured to generate data for some of the user interfaces disclosed herein.

FIG. 8 illustrates a diagram that shows example components of an example device 800 (also referred to herein as a "computing device") configured to generate data for some of the user interfaces disclosed herein. The device 800 may generate data that may include one or more sections that may render or comprise video, images, virtual objects, and/or content for display on the display screen 189. The device 800 may represent one of the device(s) described herein. Additionally, or alternatively, the device 800 may represent one of the client computing devices 1106.

As illustrated, the device 800 includes one or more data processing unit(s) 802, computer-readable media 804, and communication interface(s) 806. The components of the device 800 are operatively connected, for example, via a bus 809, which may include one or more of a system bus, a data bus, an address bus, a PCI bus, a Mini-PCI bus, and any variety of local, peripheral, and/or independent buses.

As utilized herein, data processing unit(s), such as the data processing unit(s) 802 and/or data processing unit(s) 1192, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 804 and computer-readable media 1194, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 806 may represent, for example, network interface controllers ("NICs") or other types of transceiver devices to send and receive communications over a network. Furthermore, the communication interface(s) 806 may include one or more video cameras and/or audio devices 822 to enable generation of video feeds and/or still images, and so forth.

In the illustrated example, computer-readable media 804 includes a data store 808. In some examples, the data store 808 includes data storage such as a database, data warehouse, or other type of structured or unstructured data storage. In some examples, the data store 808 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 808 may store data for the operations of processes, applications, components, and/or modules stored in computer-readable media 804 and/or executed by data processing unit(s) 802 and/or accelerator(s). For instance, in some examples, the data store 808 may store session data 810 (e.g., session data 1136 as shown in FIG. 11), profile data 88 (e.g., associated with a participant profile), and/or other data. The session data 810 can include a total number of participants (e.g., users and/or client computing devices) in a communication session, activity that occurs in the communication session, a list of invitees to the communication session, and/or other data related to when and how the communication session is conducted or hosted. The data store 808 may also include content data 814, such as the content that includes video, audio, or other content for rendering and display on one or more of the display screens 189.

Alternately, some or all of the above-referenced data can be stored on separate memories 816 on board one or more data processing unit(s) 802 such as a memory on board a CPU-type processor, a GPU-type processor, an FPGA-type accelerator, a DSP-type accelerator, and/or another accelerator. In this example, the computer-readable media 804 also includes an operating system 818 and application programming interface(s) 810 (APIs) configured to expose the functionality and the data of the device 800 to other devices. Additionally, the computer-readable media 804 includes one or more modules such as the server module 830, the output module 832, and the GUI presentation module 840, although the number of illustrated modules is just an example, and the number may vary higher or lower. That is, functionality described herein in association with the illustrated modules may be performed by a fewer number of modules or a larger number of modules on one device or spread across multiple devices.

The presently disclosed technologies are believed to be applicable to a variety of systems and approaches for presenting a status indicator within a first digital context in response to a user interacting with a data object within a second digital context. Furthermore, the presently disclosed technologies are believed to be applicable to a variety of systems and approaches for enabling a recipient of the status indicator to initiate communications, directly from the first digital context, with the user that is interacting with the data object within the second digital context. Aspects of the disclosed technologies are described in the context of a unified communications platform. While the presently disclosed technologies are not necessarily limited to this context, an appreciation of various aspects of the presently disclosed technologies is best gained through a discussion of examples in this specific context. However, the presently disclosed technologies may also be deployed in scenarios that do not include a unified communications platform such as, for example, file synchronization platforms (e.g., ONE-DRIVE, DROPBOX, etc.) file directory platforms (e.g., WINDOWS, MacOS, etc.) photo previews, SharePoint, and so on. It should also be appreciated that many variations and modifications may be made to the above-described examples, the elements of which are to be understood as being among other acceptable examples. All such modifications and variations are intended to be included herein within the scope of this disclosure and protected by the following claims.

EXAMPLE CLAUSES

Example Clause 1. A computer-implemented method for managing operation of a collaboration platform, comprising: receiving collaboration object data that defines a collaboration object (108) in the collaboration platform, wherein the collaboration object data further defines a group definition that associates a plurality of user accounts with the collaboration object; receiving an instruction (128) that causes the collaboration platform to provide access to content of a data file (124) of an application (104(2)) by exposing one or more functionalities of the application to the collaboration object; responsive to the instruction, associating the data file of the application with the collaboration object; based on the associating of the data file of the application with the collaboration object, updating application configuration parameters (122) for the application in association with the plurality of user accounts of the collaboration object; and responsive to the updating of the application configuration parameters (112), causing an instance of the application corresponding to one of the plurality of accounts to render a user interface element configured to provision access to the data file of the application via a file system of the instance (134) of the application, wherein the instance of the application has no access to the data file via the file system prior to the associating of the data file with the collaboration object.

Example Clause 2. The computer-implemented method of Example Clause 1, wherein the application configuration parameters are transmitted to the instance of the application: in response to the instruction that associates the data file with the collaboration object corresponding to the collaboration platform, and based on the group definition for the collaboration object corresponding to the first application.

Example Clause 3. The computer-implemented method of Example Clause 1, wherein the collaboration object is a communication session that is facilitated by a plurality of instances of the collaboration platform that corresponds to the group definition.

Example Clause 4. The computer-implemented method of Example Clause 3, wherein an application extension is executable by the collaboration platform during the communication session to provide content editing functionalities, of the application, to the plurality of user accounts in association with the content of the data file.

Example Clause 5. The computer-implemented method of Example Clause 1, wherein at least some of the content of the data file is generated via an application extension of the application during a communication session that is facilitated by the communication session.

Example Clause 6. The computer-implemented method of Example Clause 1, further comprising: receiving calendar activity that is associated with an invitation for the collaboration object; and determining the group definition based on at least one of: a first set of individual user accounts that have accepted the invitation for the collaboration object, or a second set of individual user accounts that have declined the invitation for the collaboration object.

Example Clause 7. The computer-implemented method of Example Clause 1, further comprising: configuring, in response to the instruction, object permissions data to grant the plurality of user accounts with access to the content of the data file corresponding to second application.

Example Clause 8. A system comprising: one or more processors; and at least one computer storage medium having computer executable instructions stored thereon which, when executed by the one or more processors, cause the system to: receive collaboration object data that includes a group definition (110) for a collaboration object (108) corresponding to a first application (104(1)), wherein the group definition associates a plurality of user accounts with the collaboration object; receive an instruction (128) to associate a data file (124), corresponding to a second application (104(2)), with the collaboration object corresponding to the first application: in response to the instruction: transmit, to a service that facilitates the second application, update data (126) that is configured to cause the service to update application configuration parameters (122) for the second application in association with the plurality of user accounts of the group definition; and execute, by the first application in association with the collaboration object, an application extension (112) of the second application to provide access to content of the data file via the collaboration object.

Example Clause 9. The system of Example Clause 8, wherein the update data causes the service to transmit the application configuration parameters to a plurality of user devices corresponding to instances of the second application that are associated with the group definition for the collaboration object.

Example Clause 10. The system of Example Clause 8, wherein the instruction includes a file pointer that identifies the data file at the service that facilitates the second application.

Example Clause 11. The system of Example Clause 8, wherein the update data, that is transmitted to the service that facilitates the second application, includes user account data associated with the group definition for the collaboration object.

Example Clause 12. The system of Example Clause 8, wherein the collaboration object is a communication session that is facilitated by a plurality of instances of the first application that corresponds to the group definition.

Example Clause 13. The system of Example Clause 8, wherein the application extension is executable by the first application during the communication session to provide content editing functionalities, of the second application, to the plurality of user accounts in association with the content of the data file.

Example Clause 14. The system of Example Clause 8, wherein the group definition corresponds to a message thread that is facilitated by a plurality of instances of the first application that corresponds to the group definition.

Example Clause 15. The system of Example Clause 8, wherein the collaboration object is a live communication session that is facilitated by a plurality of instances of the first application that corresponds to the group definition, and wherein the update data causes the service to provision access to the content of the data file during and subsequent to a termination of the live communication session via instances of the second application that are associated with the group definition for the collaboration object.

Example Clause 16. A system comprising: one or more processors; and at least one computer storage medium having computer executable instructions stored thereon which, when executed by the one or more processors, cause the system to: receive collaboration object data that includes a group definition (110) for a collaboration object (108) corresponding to a first application (104(1)); receive an instruction (128) to associate a data file (124), corresponding to a second application (104(2)), with the collaboration object corresponding to the first application, wherein the instruction causes the first application to provide access to content of the data file in association with the collaboration object via an application extension (112) of the second application that is executable by the first application; configure, in response to the instruction, object permissions data (120) to grant a plurality of user accounts identified by the group definition with access to the content of the data file corresponding to the second application; update, based on the object permission data, application configuration parameters (122) for the second application in association with the plurality of user accounts; and transmit the application configuration parameters to instances (134) of the second application that correspond to the plurality of user accounts.

Example Clause 17. The system of Example Clause 16, wherein the computer executable instructions further cause the system to: receive a selection, via an application extension graphical user interface exposed by the first application, an indication of a location for the data file within an organizational structure of the second application.

Example Clause 18. The system of Example Clause 16, wherein the computer executable instructions further cause the system to: receive, during a communication session, user input data that is generated via an instance of the second application that is executing on a second client device; and update, during the communication session, an application extension graphical user interface exposed by an instance of the first application that is executing on a first client device to render aspects of the user input data.

Example Clause 19. The system of Example Clause 16, wherein the updating the application extension graphical user interface during the communication session includes causing the instance of the first application that is executing on the first client device to render a status indicator corresponding to the user input data that is generated via the instance of the second application that is executing on the second client device.

Example Clause 20. The system of Example Clause 16, wherein the computer executable instructions further cause the system to: determine the group definition based on at least one of: calendar activity associated with the collaboration object, or attendance activity associated with the collaboration object.

CONCLUSION

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method performed by a data processing system for hosting a collaboration object having a plurality of user accounts associated with the collaboration object and for accessing activities associated with the collaboration object, the method comprising:
  receiving an indication associated with the collaboration object that, in an activity associated with the collaboration object, a data file of a software application (i) is created by a first user corresponding to a first user account of the plurality of user accounts by executing an extension of the software application with the collaboration object or (ii) is shared by the first user corresponding to the first user account of the plurality of user accounts by executing the extension of the software application with the collaboration object;
  in response to receiving the indication:
    causing the data file to be displayed in a first directory that is accessible by the collaboration object and the plurality of user accounts associated with the collaboration object;
    determining that the first user has a subscription to the software application; and
    causing, based on the first user having the subscription to the software application, the data file to be additionally displayed in a second directory that is accessible by a user-specific instance of the software application associated with the first user, wherein the second directory is different from the first directory that is accessible by the collaboration object and the plurality of user accounts associated with the collaboration object.

2. The computer-implemented method of claim 1, wherein the second directory that is accessible by the user-specific instance of the software application provides access to the data file via a pointer to the data file stored in association with the first directory.

3. The computer-implemented method of claim 1, wherein the collaboration object includes a communication session and the software application comprises one of a word processing application, a notetaking application, a whiteboard application, or a data analytics application.

4. The computer-implemented method of claim 3, wherein executing the extension of the software application with the collaboration object causes content of the data file to be displayed to a plurality of users during the communication session, the method further comprising exposing an editing function for the plurality of users to edit the content of the data file.

5. The computer-implemented method of claim 1, wherein the collaboration object comprises a message thread and the software application comprises one of a word processing application, a notetaking application, a whiteboard application, or a data analytics application.

6. The computer-implemented method of claim 1, wherein the indication includes a file pointer that identifies the data file within the user-specific instance of the software application associated with the first user.

7. The computer-implemented method of claim 1, wherein the collaboration comprises a virtual meeting with at least one of video or audio.

8. The computer-implemented method of claim 1, wherein the activity comprises collaborative editing of the data file via the plurality of user accounts.

9. A system for hosting a collaboration object having a plurality of user accounts associated with the collaboration object and for accessing activities associated with the collaboration object, the system comprising:
one or more processors; and
at least one computer storage medium having computer executable instructions stored thereon which, when executed by the one or more processors, cause the system to:
receive an indication associated with the collaboration object that, in an activity associated with the collaboration object, a data file of a software application (i) is created by a first user corresponding to a first user account of the plurality of user accounts by executing an extension of the software application with the collaboration object or (ii) is shared by the first user corresponding to the first user account of the plurality of user accounts by executing the extension of the software application with the collaboration object;
in response to receiving the indication:
cause the data file to be displayed in a first directory that is accessible by the collaboration object and the plurality of user accounts associated with the collaboration object;
determine that the first user has a subscription to the software application; and
cause, based on the first user having the subscription to the software application, the data file to be additionally displayed in a second directory that is accessible by a user-specific instance of the software application associated with the first user, wherein the second directory is different from the first directory that is accessible by the collaboration object and the plurality of user accounts associated with the collaboration object.

10. The system of claim 9, wherein the second directory that is accessible by the user-specific instance of the software application provides access to the data file via a pointer to the data file stored in association with the first directory.

11. The system of claim 9, wherein the collaboration object includes a communication session and the software application comprises one of a word processing application, a notetaking application, a whiteboard application, or a data analytics application.

12. The system of claim 11, wherein executing the extension of the software application with the collaboration object causes content of the data file to be displayed to a plurality of users during the communication session, the computer executable instructions further causing the system to expose an editing function for the plurality of users to edit the content of the data file.

13. The system of claim 9, wherein the collaboration object comprises a message thread and the software application comprises one of a word processing application, a notetaking application, a whiteboard application, or a data analytics application.

14. The system of claim 9, wherein the indication includes a file pointer that identifies the data file within the user-specific instance of the software application associated with the first user.

15. The system of claim 9, wherein the collaboration comprises a virtual meeting with at least one of video or audio.

16. The system of claim 9, wherein the activity comprises collaborative editing of the data file via the plurality of user accounts.

17. At least one computer storage medium having computer executable instructions stored thereon which, when executed by one or more processors, cause a system for hosting a collaboration object having a plurality of user accounts associated with the collaboration object and for accessing activities associated with the collaboration object to perform operations comprising:
receive an indication associated with the collaboration object that, in an activity associated with the collaboration object, a data file of a software application (i) is created by a first user corresponding to a first user account of the plurality of user accounts by executing an extension of the software application with the collaboration object or (ii) is shared by the first user corresponding to the first user account of the plurality of user accounts by executing the extension of the software application with the collaboration object;
in response to receiving the indication:
cause the data file to be displayed in a first directory that is accessible by the collaboration object and the plurality of user accounts associated with the collaboration object;
determine that the first user has a subscription to the software application; and
cause, based on the first user having the subscription to the software application, the data file to be additionally displayed in a second directory that is accessible by a user-specific instance of the software application associated with the first user, wherein the second directory is different from the first directory that is accessible by the collaboration object and the plurality of user accounts associated with the collaboration object.

18. The at least one computer storage medium of claim 17, wherein the second directory that is accessible by the user-specific instance of the software application provides access to the data file via a pointer to the data file stored in association with the first directory.

19. The at least one computer storage medium of claim 17, wherein the collaboration object includes a communication session and the software application comprises one of a word processing application, a notetaking application, a whiteboard application, or a data analytics application.

20. The at least one computer storage medium of claim 19, wherein executing the extension of the software application with the collaboration object causes content of the data file to be displayed to a plurality of users during the communication session, the computer executable instructions further causing the system to expose an editing function for the plurality of users to edit the content of the data file.

* * * * *